(12) United States Patent
Dasher et al.

(10) Patent No.: US 12,200,078 B1
(45) Date of Patent: Jan. 14, 2025

(54) METHODS AND SYSTEMS FOR CONFIGURING A USER DEVICE

(71) Applicant: Adeia Guides Inc., San Jose, CA (US)

(72) Inventors: Charles Dasher, Lawrenceville, GA (US); Christopher Phillips, Hartwell, GA (US); Reda Harb, Tampa, FL (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/215,568

(22) Filed: Jun. 28, 2023

(51) Int. Cl.
*H04L 67/50* (2022.01)
*H04L 67/306* (2022.01)

(52) U.S. Cl.
CPC .......... *H04L 67/535* (2022.05); *H04L 67/306* (2013.01)

(58) Field of Classification Search
None
See application file for complete search history.

(56) References Cited

U.S. PATENT DOCUMENTS

| | | | | |
|---|---|---|---|---|
| 11,061,744 | B2* | 7/2021 | Louch | G06F 3/04845 |
| 2012/0174212 | A1* | 7/2012 | Dart | G06F 9/44505 |
| | | | | 726/19 |
| 2012/0239786 | A1 | 9/2012 | Repasi | |
| 2013/0235073 | A1 | 9/2013 | Jaramillo et al. | |
| 2016/0132849 | A1 | 5/2016 | Melo et al. | |
| 2016/0253710 | A1* | 9/2016 | Publicover | H04W 4/21 |
| | | | | 705/14.66 |
| 2017/0099602 | A1* | 4/2017 | Joo | G06F 21/32 |
| 2017/0188095 | A1 | 6/2017 | Zhao | |
| 2018/0063317 | A1 | 3/2018 | Simpson et al. | |
| 2019/0171762 | A1* | 6/2019 | Luke | G06F 3/165 |
| 2019/0208242 | A1 | 7/2019 | Bates et al. | |
| 2019/0361694 | A1 | 11/2019 | Gordon et al. | |
| 2019/0394530 | A1 | 12/2019 | Kimble et al. | |
| 2021/0088337 | A1* | 3/2021 | Koubaa | G01C 21/20 |
| 2022/0028249 | A1 | 1/2022 | Saldin et al. | |
| 2022/0058267 | A1 | 2/2022 | Chow | |
| 2022/0179665 | A1 | 6/2022 | Rathod | |
| 2022/0321964 | A1 | 10/2022 | Raj et al. | |
| 2022/0382766 | A1 | 12/2022 | Chapman et al. | |

OTHER PUBLICATIONS

Fernandez et al., "Application of Multi-Pronged Monitoring and Intent-Based Networking to Verticals in Self-Organising Networks", Dec. 12, 2022, IEEE, 2022 5th International Conference on Advanced Communication Technologies and Networking (CommNet) (2022, pp. 1-10) (Year: 2022).*
U.S. Appl. No. 18/215,592, filed Jun. 28, 2023, Charles Dasher.

\* cited by examiner

*Primary Examiner* — Davoud A Zand
(74) *Attorney, Agent, or Firm* — Haley Guiliano LLP

(57) ABSTRACT

Systems and methods are described for modifying a setting of a second user device based on derived contextual information or outputting a recommendation of media content based on the contextual information. A modification of a setting of a first user device is determined. Contextual information relating to the modification is derived.

20 Claims, 27 Drawing Sheets

Fig. 1

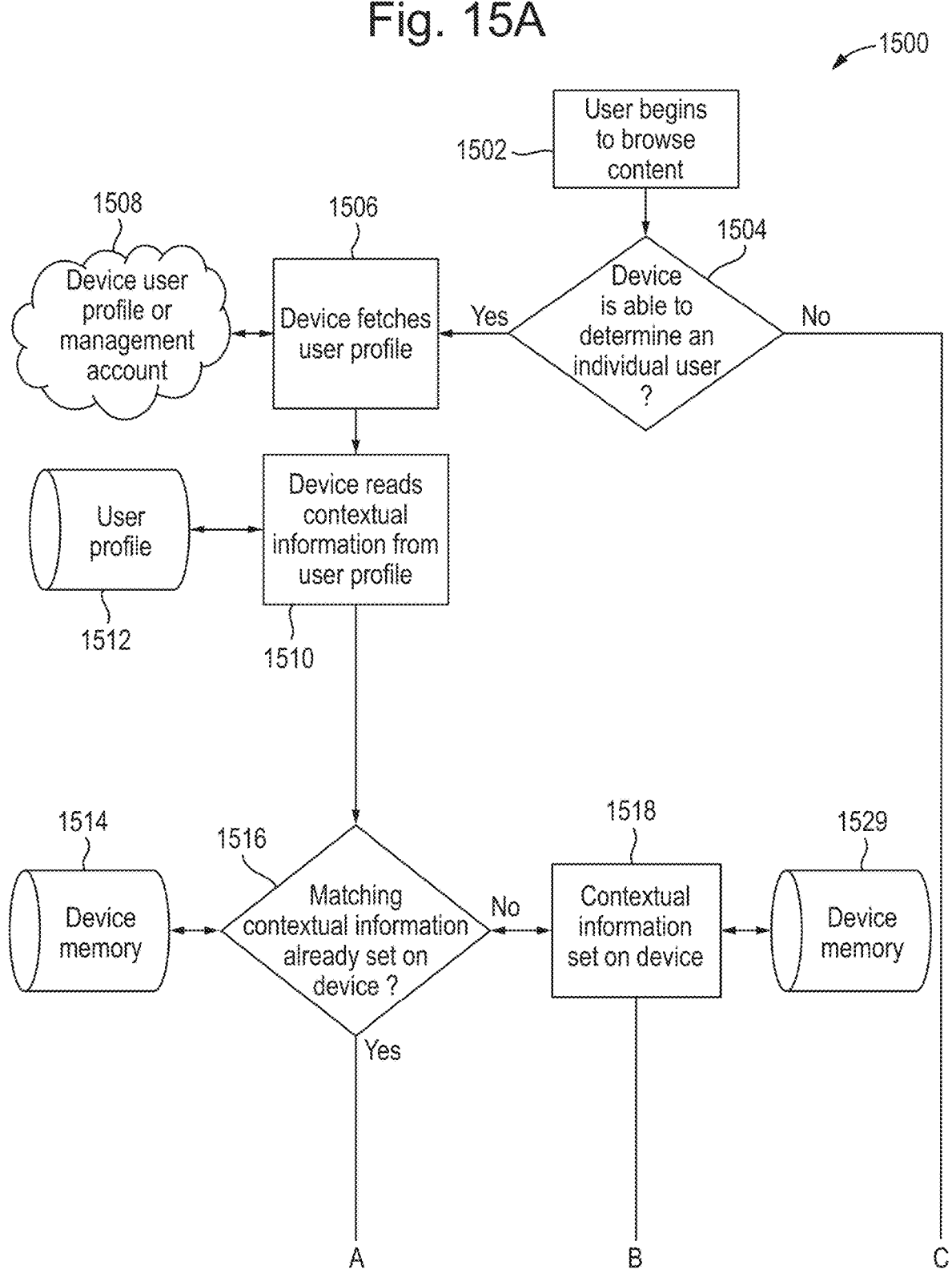

METHODS AND SYSTEMS FOR CONFIGURING A USER DEVICE

BACKGROUND

The present disclosure relates to methods and systems for configuring a user device. Particularly, but not exclusively, the present disclosure relates to configuring settings of a user device or recommending media content.

SUMMARY

User devices generally enable a user to customize their device by changing elements such as the background, screensaver, notification sounds, and ring tones. However, a user would typically be required to change the settings of each of their devices on a device-by-device basis in order to customize each device in a similar manner. A need therefore exists to improve the efficiency with which a plurality of devices can be themed.

Systems and methods are provided herein for theming a plurality of user devices. For example, a setting of a user device modified by a user may be used to propagate a theme across a plurality of devices associated with the same user, thereby improving the efficiency of device theming. For example, processing requirements may be reduced for the modification of settings, as a configuration may be set for a particular type of setting (e.g., sound, image) for a plurality of devices having the same setting type, rather than determining a configuration for each setting of each device. In an example, by using contextual information derived from data relating to a user, such as context derived from a modification of a setting at a first user device (e.g., a wallpaper or screensaver), a setting of a user device (e.g., the first user device and/or a second user device) may be modified based on the contextual information, for example, so that other elements of the user device (e.g., the first user device and/or a second user device) may be adapted to correspond to the user's selection.

Systems and methods are provided herein for determining media content to output, suggest, or present, to a user device. For example, by using contextual information derived from data relating to a user, such as a modification of a setting of a first user device, media content to be presented or suggested to a user may be determined based on the derived context, thereby improving the personalization of personalized content. For example, media content corresponding to the derived contextual information may be caused to be presented to the user.

According to the systems and methods described herein, a modification of a setting of a first user device is determined. For example, a modification of a setting of a user interface of the first user device may be determined, such as a selection of a particular theme or the modification of a theme setting, or a change of wallpaper or lock-screen image. Contextual information relating to the modification is derived. The contextual information may indicate a general category to which an aspect derived from the modified setting belongs, such as a general category of an image set as a background at a first user device, or a particular song set as a ringtone, and/or may indicate a particular element, or type of element, derivable from the aspect, such as an object shown in the image set as the background. For example, contextual information may provide information on a general category to which sounds, objects, people, animals, scenery, events, and so on, belong, and/or may provide information on the particular sounds, objects, people, animals, scenery, events, and so on, that are shown in or associated with an aspect derived from the modified setting. The contextual information may comprise a description relating to an aspect of the modified setting, such as metadata describing the aspect of the modified setting. For example, where the modification is a change of a screensaver to an image of the seaside, the contextual information may comprise metadata of "seaside", "beach", "sand", and/or "sea". A setting of a second user device may be modified based on the derived contextual information. The setting of the second user device may be a theme (e.g., operational theme) setting of the second user device. The second user device may be a type of user device which is different from the type of the first user device. For example, the first user device may be a smartphone, and the second user device may be a smart speaker. The first user device and/or the second user device may, for example, be any of, or any combination of, a smart speaker (e.g., comprising a voice assistant), a smart watch, an extended reality (XR) device (e.g., an augmented reality (AR) head mounted device (HMD), virtual reality (VR) HMD), a vehicle (such as an automobile), a television (e.g., a working in combination with a set top box, or a smart TV), an HDMI stick, a computer (e.g., a laptop, desktop), or a phone (e.g., a smartphone). A setting modified for the second user device may be a setting which is different to the setting of the first user device which is modified (e.g., the modified setting of the second user device may be an audio setting, whereas the modified setting of the first user device may be a visual setting). The contextual information may be used to determine a way in which the second user device may be modified to be consistent with the modified settings of the first user device. Following the example above, where the modification is a change of a screensaver to an image of the seaside, and the contextual information comprises metadata of "beach", "sand", and "sea", a notification alert of the second user device may be modified based on the contextual information (e.g., to correspond to a "beach" theme), for example, by using the sound of a seagull. An image set as the screensaver of the second user device may also correspond to the "beach" theme, and may be the same as, or different to, the screensaver of the first user device. In some examples, in addition to or instead of the modifying of the setting of the second user device, a setting of the first user device may be modified (e.g., an additional setting to the modified setting of the first user device from which contextual information is derived may be modified. For example, where the contextual information has been derived from an image, sound notifications of the first user device may be altered to be consistent with the contextual information). In addition to, or instead of, the step of modifying a setting of a second user device based on the derived contextual information, a recommendation of media content may be output based on the contextual information. For example, where the derived contextual information comprises metadata of "Christmas", the media content output may comprise suggestions relating to "Christmas", such as Christmas films, or Christmas music. In addition to, or instead of, the step of modifying a setting of a second user device based on the derived contextual information media content may be output based on the contextual information. The media content output may be "biased" based on the contextual information. For example, the media content output to a user device may comprise a higher proportion of content that corresponds to the contextual information.

According to the systems and methods described herein, contextual information may be derived based on media content associated with a user. For example, the contextual information may be derived based on viewing history of a user. The media content associated with a user may be media content previously or currently consumed by a user, such as a TV show, film, music, video game, or images. The media content associated with a user may be media content linked to a user profile of the user, such as media content owned, purchased, rented, or saved to a user profile of the user. A setting of a first user device and/or a second user device may be modified based on the derived contextual information. For example, where a user is watching a TV show, a wallpaper of a user device may be modified to a wallpaper comprising an image relating to the TV show, such as an image of the characters of the TV show, or a scene in the TV show. A recommendation or suggestion of media content, or media content, may be output based on the contextual information.

According to the systems and methods described herein, contextual information may be derived based on user history. For example, user history may be history of media content consumed by the user. User history may be browser history of a user. For example, browser history of a user may be parsed to determine a frequently searched word, or frequently visited website, for example, "Dogs" or a website relating to dogs. A setting of a first user device and/or a second user device may be modified based on the derived contextual information. For example, a wallpaper of a user device may be modified to comprise an image of a dog. A recommendation or suggestion of media content, or media content, may be output based on the contextual information.

According to the systems and methods described herein, contextual information may be derived based on at least one user preference. A user preference may be determined based on a user profile, for example, metadata describing the interests of a user. A setting of a first user device and/or a second user device is modified based on the derived contextual information. A recommendation or suggestion of media content, or media content, may be output based on the contextual information.

According to the systems and methods described herein, contextual information may be derived based on a determined location of a user. For example, the contextual information may indicate a country that the user is currently in, for example, when the user is on holiday, or determine an event that the user is attending, for example, a sporting event. A setting of a first user device and/or a second user device may be modified based on the derived contextual information. For example, a wallpaper of a user device may be modified to show an image related to the country in which the user is holidaying, or a sporting event which the user is attending. A recommendation or suggestion of media content, or media content, may be output based on the contextual information.

According to the systems and methods described herein, participation of a user in a group event may be detected. For example, it may be detected that a user is participating in a group activity such as a watch party, multiplayer gaming party, or a sporting event. Contextual information may be derived relating to the group event. For example, the contextual information may indicate the type of group event, the type of activity to which the group event relates, such as a sporting event, and so on. For example, where the group event is a plurality of users viewing a soccer game, the contextual information may comprise information such as "soccer", and may indicate the teams playing. A setting of a user device is modified based on the derived contextual information. For example, a wallpaper of a user device may be modified to show a logo of a team playing in the sporting event (e.g., a logo of a team that the user supports), or images of players of a team playing in the sporting event. A recommendation or suggestion of media content, or media content, may be output based on the contextual information.

According to the systems and methods described herein, data relating to a user is received. For example, the data may comprise any or any combination of information relating to a modification of a setting of a user device, media content associated with a user or user profile, a user preference, user history, location of a user, participation in a group event. Contextual information is derived from the data relating to the user. A setting of a user device may be modified based on the derived contextual information. A recommendation or suggestion of media content, or media content, may be output based on the contextual information.

In some examples, an operational theme is determined based on the contextual information. For example, an operational theme may be a theme for a plurality of settings of a user device, such as settings of a user interface (e.g., wallpaper, screensaver, color themes of notifications, notification sounds, and so on). The operational theme may define the setting (or settings) of the second user device. For example, the operational theme may define settings of a user interface of the second user device. In some examples, one operational theme may be determined and used to theme a plurality of user devices. In some examples, an operational theme may be determined for (e.g., at) each device based on the contextual information.

In some examples, the media content corresponds to the operational theme. The operational theme may be based on the media content. For example, the operational theme may comprise settings that relate to the media content. For example, where the media content is a TV show, and the contextual information is derived from the media content, the operational theme may define a wallpaper comprising an image of characters of the TV show, and may define a sound for a notification as the theme song of the TV show. In a further example, where the contextual information is "Christmas", media content suggested to a user may be films, TV, or songs with a Christmas theme, and additionally or alternatively, a Christmas operational theme may be used to adapt settings of the user device, such as providing a snowy backdrop to the suggestion of media content, and playing a Christmas background song such as "jingle bells".

In some examples, the operational theme is a predefined theme corresponding to the contextual information. For example, the contextual information may be used to select a theme from a plurality of themes which corresponds most closely to the contextual information. For example, where the contextual information is "beach", the theme selected may be "desert island". In some examples, the operational theme is generated based on the contextual information. For example, where the contextual information is "beach", the operational theme may be generated by selecting images, sounds, and so on, for settings of a user device that correspond to the contextual information.

In some examples, the modification of the setting of the second user device comprises a modification of the setting of an interface of the second user device. For example, a graphical user interface may be adapted. In some examples, the modification of the setting of the second user device comprises a modification of the setting of the appearance of the second user device. For example, a user interface may be modified, or a color of, e.g., lights, may be altered. In some examples, the modification of the setting of the second user device comprises a modification of the setting of a physical configuration of the second user device. For example, the color of lights may be altered, or a "skin" of a device may be altered, for example, where the skin of the device comprises an e-ink surface. Any number or combination of settings may be modified.

In some examples, a plurality of devices may be modified based on the contextual information. Each device may be modified based on the type of settings available for modification at that device (e.g., each device may be modified in a different way). For example, where devices comprise different types of settings (e.g., audio settings, visual settings, and so on), a device may be modified based on the particular settings of that device. In an example, based on the derived contextual information, a smart speaker may modify its notification sounds and indicator colors, an HDMI stick may modify its display theme and film recommendations, and a vehicle such as a car may modify its exterior colors, interior lighting colors and modify its infotainment system to apply a particular visual theme.

In some examples, the modification of the setting of the first user device comprises a modification of the setting of an interface of the first user device. For example, a color theme of a user interface may be altered, a wallpaper may be altered, sound notifications may be altered. In some examples, the modification of the setting of the first user device comprises a modification of the setting of the appearance of the first user device. For example, the color of lights, or the skin of a device, may be altered. In some examples, the modification of the setting of the first user device comprises a modification of a setting of a physical configuration of the first user device. In some examples, the modification of the setting of the first user device comprises a selection of a wallpaper for the first user device. In some examples, the modification of the setting of the first user device comprises a selection of a screensaver for the first user device. In some examples, the modification of the setting of the first user device comprises a selection of a theme for the first user device. In some examples, the modification of the setting of the first user device comprises a selection of an audio file for a notification setting of the first user device. In some examples, the modification of the setting of the first user device comprises a selection of an audio file for use with a virtual assistant.

In some examples, the first user device and the second user device are linked by a user profile. For example, a user profile may be or comprise information relating to an account of a user. The user profile may be associated with a plurality of user devices. For example, a device on which a user has "logged in" to an account may be a device linked by a user profile. In some examples, the first user device and/or the second user device are connected to a user device linked to a user profile (e.g., where the first or second user device is a pair of headphones connected to a smartphone). In some examples, the first user device and the second user device are used by the user. In some examples, the contextual information, or the change to a setting of a first user device, is propagated to a plurality of user devices. For example, by determining contextual information relating to the change made to the first user device, the change of settings of other devices may also be determined based on the contextual information, so all or a plurality of devices belonging to a particular user may be consistent across devices (e.g., all devices have a consistent "theme"). The settings of particular applications (e.g., of a user device) may be altered for a user profile of that application. For example, where the application is a media content viewing application, such as a streaming service, setting of the graphical user interface of the application may be altered based on the "theme" determined for a user profile. The contextual information may be stored in connection with a user profile, where the stored contextual information is retrieved for modification of settings of a user device or recommending media content.

In some examples, the operational theme is updated responsive to receiving additional information associated with the operational theme. For example, the operational theme may be a dynamic theme, which may change, or update, for example, based on additionally received information. For example, where the operational theme is based on media content, such as a TV show viewed by a user, the user's progress through a series of the TV show may be linked to the operational theme. For example, the operational theme may differ depending on which episode the user has most recently viewed. Therefore, based on additional information which indicates which episode the user is currently watching, or has watched, the operational theme may be updated.

In some examples, an option to update the operational theme is output to an interface of the first user device or the second user device when the additional information is received. For example, an option for the user to "subscribe" to a theme to receive updates based on the theme may be output to the first user device. The "subscription" may comprise an option to purchase content associated with the theme. For example, an option to purchase a soundtrack to a TV show on which the theme is based may be output. The operational theme may be updated responsive to receiving confirmation that the operational theme is to be updated. For example, the user may opt to subscribe to the subscription, for example, by providing permission for the theme to be updated, or for the user to be billed for additional content relating to the theme.

In some examples, a representation of the modification of the setting of the second user device is output to a user interface of the first user device or the second user device prior to modifying the setting. For example, the user may be able to view the modification before it is applied to a user device, such as viewing how an operational theme will appear on a plurality of different devices. The setting of the second user device may be modified responsive to receiving confirmation that the modification of the setting is to be applied.

In some examples, the media content comprises any, or any combination of, video content, audio content, a video game, a television show, an e-book, a film, an audiobook, a song, an image, or an advertisement.

In some examples, an option to add the recommended media content to a user profile of the user is output to an interface of the first user device. For example, media content may be purchased, rented, or saved, at a user device or to a user profile. The media content may be added to the user profile responsive to receiving confirmation that the media content is to be added.

In some examples, the recommendation of media content is output to the first user device or to another device. For example, settings of a first user device may be modified based on contextual information, where the recommendation of media content determined based on the contextual information is output to a second user device, such as a television, on which a user is streaming media content.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIGS. 15A and 15B show a flowchart representing a process for outputting a recommendation of media content based on contextual information set at a user profile, in accordance with some examples of the disclosure;

DETAILED DESCRIPTION

Figure 1:
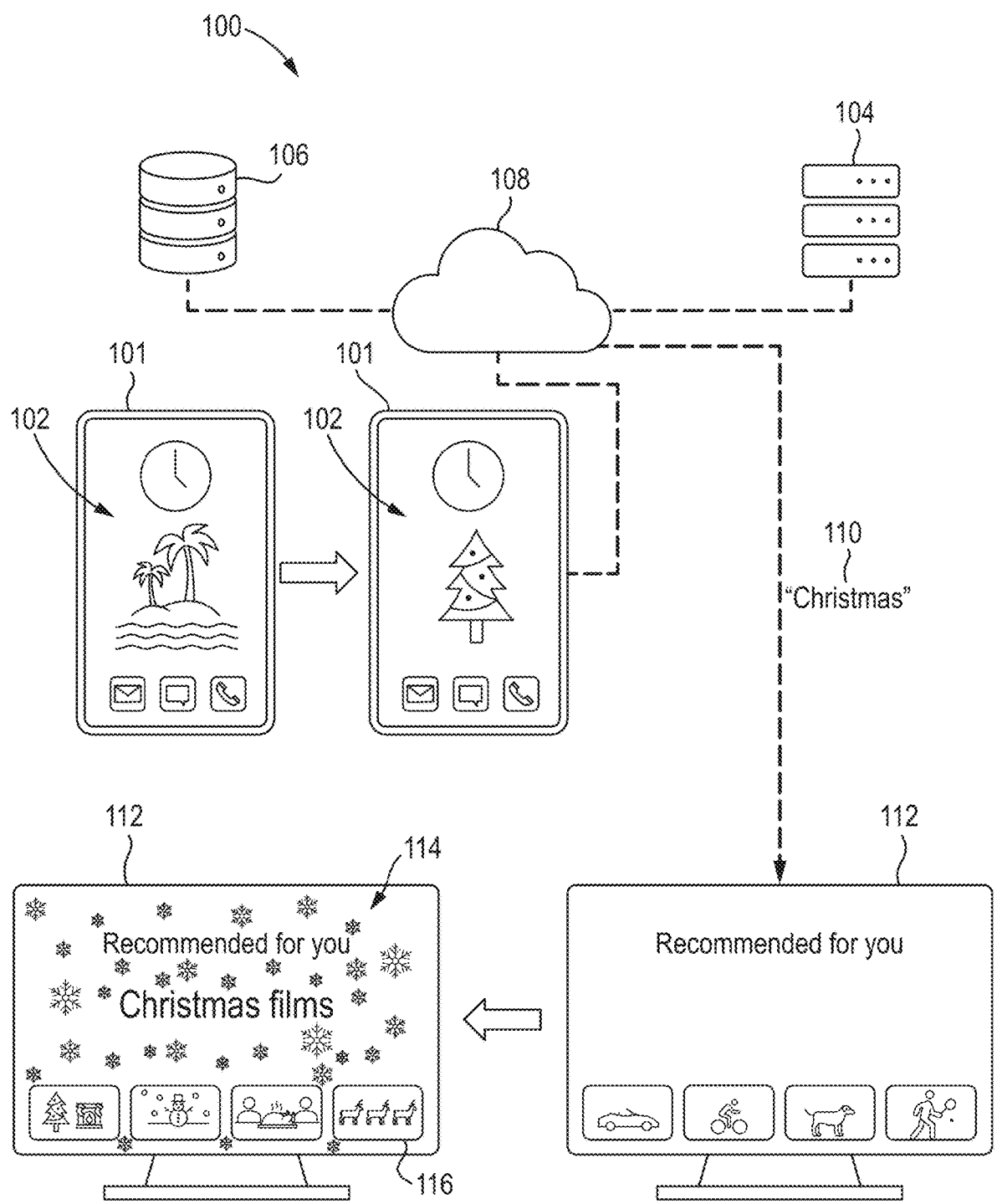
FIG. 1 illustrates an overview of the system for modifying a setting of a user device based on derived content, and outputting a recommendation of media content based on the contextual information, in accordance with some examples of the disclosure.

FIG. 1 illustrates an overview of a system 100 for modifying a setting of a user device, e.g., settings relating to the configuration of the device, such as the configuration of a graphical user interface, the appearance of the device, and/or a physical setting of the device, and for recommending media content to a user. In particular, the example shown in FIG. 1 illustrates a first user device 101, which in this example is a smart phone, but may be any user device, such as a wearable smart device, such as a smart watch, a smart ring, a virtual assistant device, a television, smart lighting, a computer, and so on. The first user device 101 is communicatively coupled to a server 104 and a content item database 106, e.g., via network 108. In this manner, the first user device 101 may provide to the server 104 information on settings of the first user device. As is illustrated in this example, a setting of the first user device 101 is modified. In particular, a wallpaper 102 of the first user device 101 is changed from a wallpaper 102 depicting an island scene, to wallpaper 102 depicting a Christmas tree. Control circuitry of the first user device 101 may be configured to determine the modification of a setting of the first user device 101 and/or send an indication of the modification to a server 104.

The server 104 receives an indication of this modification. For example, the server 104 may receive the image that has been set as the new wallpaper of the first user device 101. Control circuitry of the server 104 may then process the image (e.g., using a content database 106) to derive contextual information relating to the modification. For example, the server 104 may determine, using any appropriate processing method, such as computer vision processes, an image processing process, a machine learning model, an artificial intelligence, object recognition processes, and so on, which is capable of extracting information, objects in the image, or a general category to which the image belongs, and may generate metadata comprising descriptors of, for example, a general concept to which the image relates, as the contextual information 110. In some examples, the server 104 may additionally or alternatively receive metadata relating to the image, such as descriptions of a category of the image, or objects shown in the image. In this example, it is determined that the Christmas tree in the image belongs to a general category of "Christmas". The contextual information 110 derived from the modification of the setting is set as "Christmas". The contextual information 110 may additionally be set at, or stored in association with, a user profile corresponding to the user.

Then, a setting of a second user device 112 is modified based on the derived contextual information 110. In this example, the second user device 112 is a television displaying a streaming service, however, it will be appreciated that the second user device may be any user device, such as those described above. The modification is determined by determining assets relating to settings of the second user device 112 which may be retrieved which correspond to the contextual information 110. For example, assets may comprise images, sounds, color settings and so on, that may be incorporated into a user interface, or used in conjunction with any other settings which may alter the configuration of a user device. In this example, it is determined that the setting of the second user device 112 that is to be modified based on the derived contextual information 110 is the background of a streaming service. Images corresponding to the contextual information 110 are detected, for example, by communication with the content database 106, or another content database, or locally at the second user device. For example, the contextual information 110 may be compared to metadata of images at the second user device 112 in order to find metadata that matches the contextual information 110. An image of falling snow is detected as being associated with the contextual information of "Christmas" (e.g., comprises metadata with the term "Christmas"). The background 114 of the streaming service is then modified to comprise the image of falling snow. While in this example, the deriving of the contextual information 110 is performed by control circuitry of the server 104, it will be appreciated that the derivation may be performed locally by control circuitry of the first user device 101 (and associated with a user profile), where the contextual information 110 may then be sent to the second user device 112 for control circuitry of second user device 112 to determine a modification of a setting locally, or control circuitry of the server may determine an adjustment to be made to a setting of the second user device 112, and send an instruction to the second user device 112 to perform the adjustment. In some examples, control circuitry of the first user device 101 may further determine the modification of the setting of the second user device 112, and send the modification or instructions to perform the modification to the second user device 112, directly or indirectly.

FIG. 1 illustrates an option for outputting a recommendation of media content 116 based on the contextual information 110. For example, using the contextual information, which in this example is "Christmas", a recommendation of media content relating to "Christmas", in this example, Christmas films, are output to the second user device 112 (it will be appreciated that alternatively, the recommendation of media content may be output to the first user device 101), for example, by determining films having associated metadata of "Christmas". The determination as to which media content is to be displayed to the second user device 112 based on the received contextual information 110 may be made, for example, at a media content server with which the second user device 112 is in communication, and which is used to stream content to the second user device. For example, the contextual information may be sent from the second user device 112 to the media content server. In some examples, the contextual information 110 is sent directly to the media content server rather than to the second user device 112, where the media content server then determines content to be output at the second user device 112 based on the received contextual information 110. In further examples, the server 104 is the media content server. Again, while in this example, the deriving of the contextual information 110 is performed at the server 104, it will be appreciated that the derivation may be performed locally at the first user device 101 (and associated with a user profile), where the contextual information 110 may then be sent to the second user device 112 for the second user device 112 to locally determine a recommendation of media content 116, or the server may determine a recommendation of media content 116, and send an instruction to the second user device 112 on the media content to display at the second user device 112.

Figure 2:
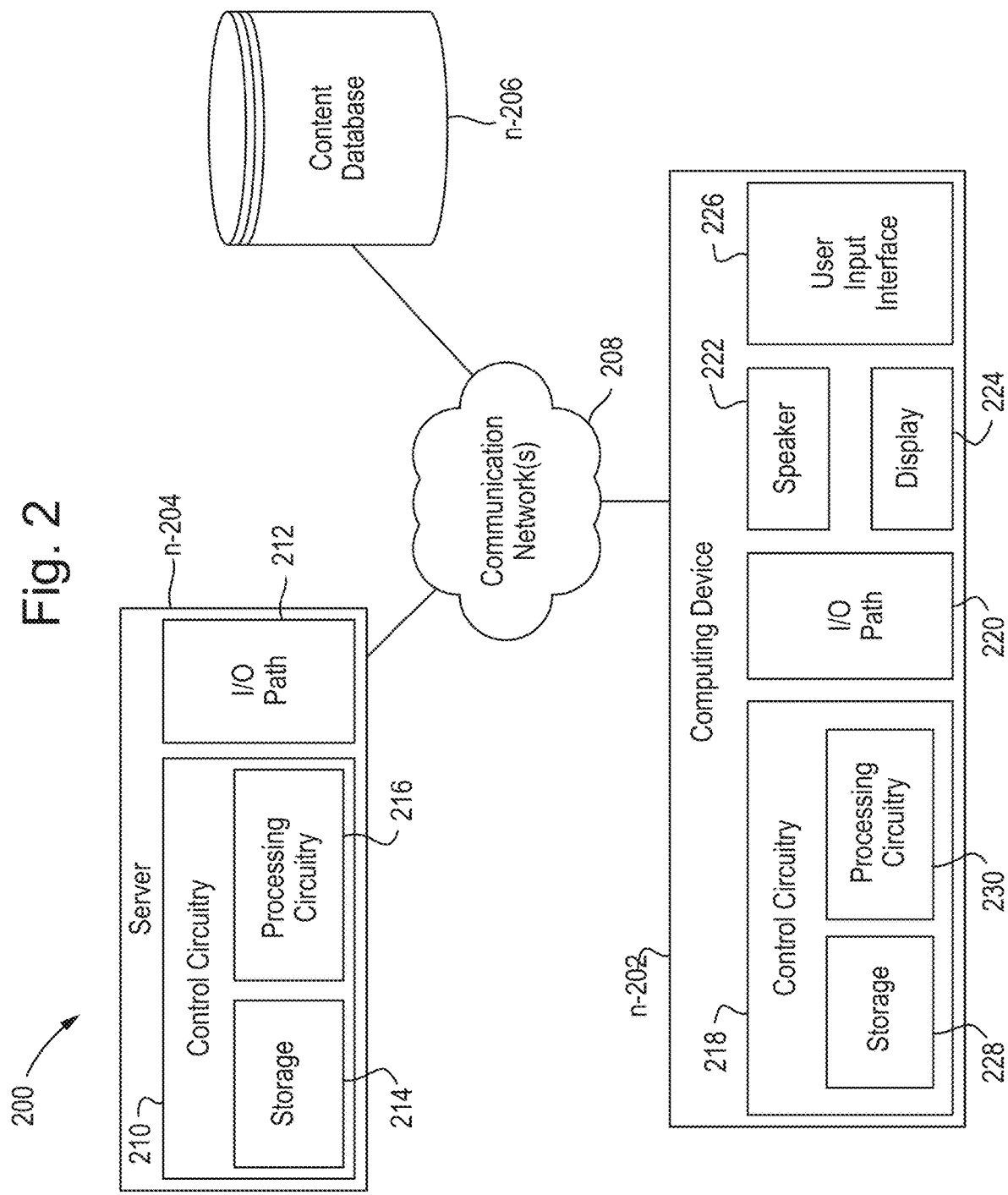
FIG. 2 is a block diagram showing components of an example system for modifying a setting of a user device based on derived content, and/or outputting a recommendation of media content based on the contextual information, in accordance with some examples of the disclosure.

FIG. 2 is an illustrative block diagram showing example system 200, e.g., a non-transitory computer-readable medium, configured to modify settings of a user device or recommend media content to a user device based on contextual information. Although FIG. 2 shows system 200 as including a number and configuration of individual components, in some examples, any number of the components of system 200 may be combined and/or integrated as one device, e.g., as first user device 101. System 200 includes computing device n-202 (denoting any appropriate number of computing devices, such as user device 101 and/or second user device 112), server n-204 (denoting any appropriate number of servers, such as server 104), and one or more content databases n-206 (denoting any appropriate number of content databases, such as content database 106), each of which is communicatively coupled to communication network 208, which may be the Internet or any other suitable network or group of networks, such as network 108. In some examples, system 200 excludes server n-204, and functionality that would otherwise be implemented by server n-204 is instead implemented by other components of system 200, such as computing device n-202. For example, computing device n-202 may implement some or all of the functionality of server n-204, allowing computing device n-202 to communicate directly with content database n-206. In still other examples, server n-204 works in conjunction with computing device n-202 to implement certain functionality described herein in a distributed or cooperative manner.

Server n-204 includes control circuitry 210 and input/output (hereinafter "I/O") path 212, and control circuitry 210 includes storage 214 and processing circuitry 216. Computing device n-202, which may be an MD, a personal computer, a laptop computer, a tablet computer, a smartphone, a smart television, or any other type of computing device, includes control circuitry 218, I/O path 220, speaker 222, display 224, and user input interface 226. Control circuitry 218 includes storage 228 and processing circuitry 220. Control circuitry 210 and/or 218 may be based on any suitable processing circuitry such as processing circuitry 216 and/or 230. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some examples, processing circuitry may be distributed across multiple separate processors, for example, multiple of the same type of processors (e.g., two Intel Core i9 processors) or multiple different processors (e.g., an Intel Core i7 processor and an Intel Core i9 processor).

Each of storage 214, 228, and/or storages of other components of system 200 (e.g., storages of content database 206, and/or the like) may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 2D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each of storage 214, 228, and/or storages of other components of system 200 may be used to store various types of content, metadata, and or other types of data. Non-volatile memory may also be used (e.g., to launch a boot-up routine and other instructions). Cloud-based storage may be used to supplement storages 214, 228 or instead of storages 214, 228. In some examples, control circuitry 210 and/or 218 executes instructions for an application stored in memory (e.g., storage 214 and/or 228). Specifically, control circuitry 210 and/or 218 may be instructed by the application to perform the functions discussed herein. In some implementations, any action performed by control circuitry 210 and/or 218 may be based on instructions received from the application. For example, the application may be implemented as software or a set of executable instructions that may be stored in storage 214 and/or 228 and executed by control circuitry 210 and/or 218. In some examples, the application may be a client/server application where only a client application resides on computing device n-202, and a server application resides on server n-204.

The application may be implemented using any suitable architecture. For example, it may be a stand-alone application wholly implemented on computing device n-202. In such an approach, instructions for the application are stored locally (e.g., in storage 228), and data for use by the application is downloaded on a periodic basis (e.g., from an out-of-band feed, from an Internet resource, or using another suitable approach). Control circuitry 218 may retrieve instructions for the application from storage 228 and process the instructions to perform the functionality described herein. Based on the processed instructions, control circuitry 218 may determine what action to perform when input is received from user input interface 226.

In client/server-based examples, control circuitry 218 may include communication circuitry suitable for communicating with an application server (e.g., server n-204) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the Internet or any other suitable communication networks or paths (e.g., communication network 208). In another example of a client/server-based application, control circuitry 218 runs a web browser that interprets web pages provided by a remote server (e.g., server n-204). For example, the remote server may store the instructions for the application in a storage device. The remote server may process the stored instructions using circuitry (e.g., control circuitry 210) and/or generate displays. Computing device n-202 may receive the displays generated by the remote server and may display the content of the displays locally via display 224. This way, the processing of the instructions is performed remotely (e.g., by server n-204) while the resulting displays, such as the display windows described elsewhere herein, are provided locally on computing device n-202. Computing device n-202 may receive inputs from the user via input interface 226 and transmit those inputs to the remote server for processing and generating the corresponding displays.

A computing device n-202 may send instructions, e.g., to initiate an XR experience and allow a user to view and interact with another user in an XR environment, to control circuitry 210 and/or 218 using user input interface 226.

User input interface 226 may be any suitable user interface, such as a remote control, trackball, keypad, keyboard, touchscreen, touchpad, stylus input, joystick, voice recognition interface, gaming controller, or other user input interfaces. User input interface 226 may be integrated with or combined with display 224, which may be a monitor, a television, a liquid crystal display (LCD), an electronic ink display, or any other equipment suitable for displaying visual images.

Server n-204 and computing device n-202 may transmit and receive content and data via I/O path 212 and 220, respectively. For instance, I/O path 212, and/or I/O path 220 may include a communication port(s) configured to transmit and/or receive (for instance to and/or from content database n-206), via communication network 208, content item identifiers, content metadata, natural language queries, and/or other data. Control circuitry 210 and/or 218 may be used to send and receive commands, requests, and other suitable data using I/O paths 212 and/or 220.

Figure 3:
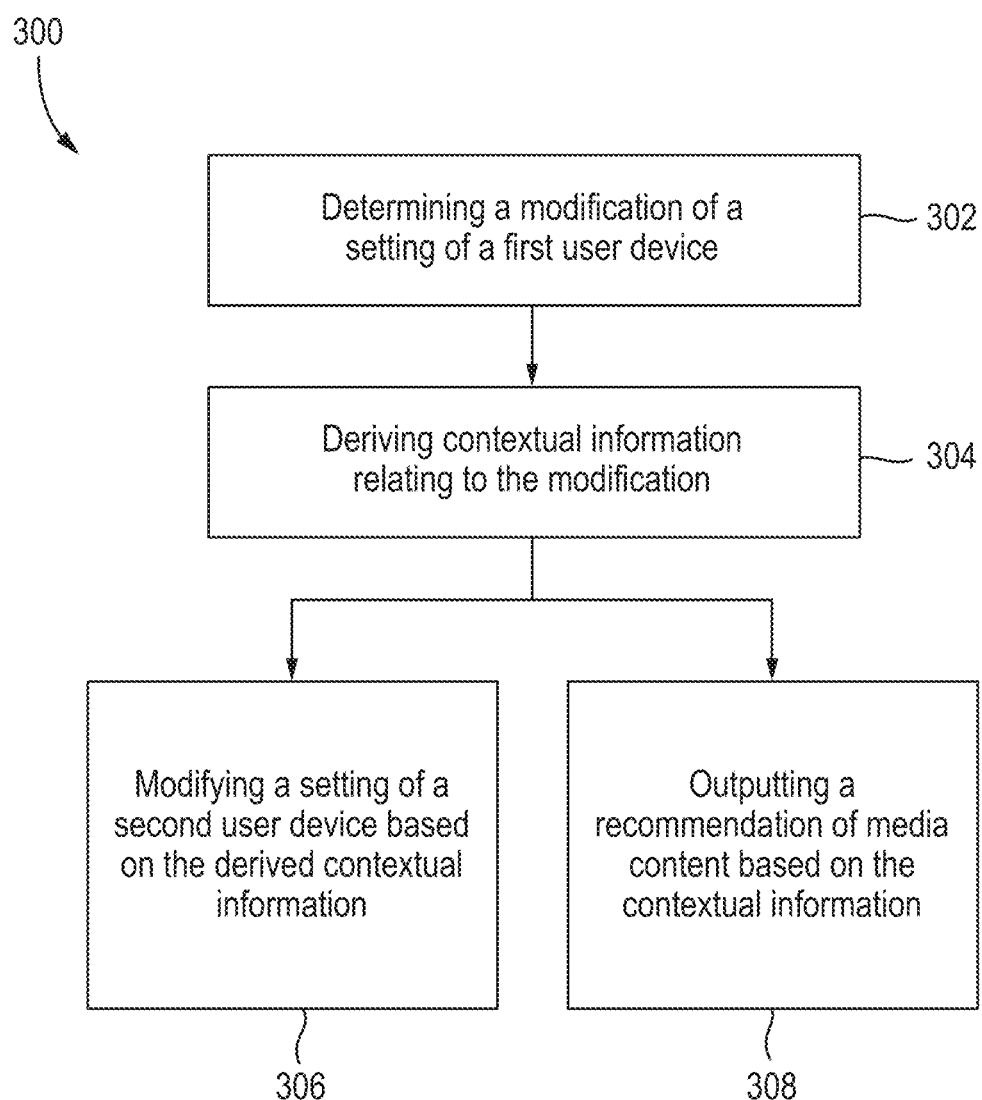
FIG. 3 is a flowchart representing a process for modifying a setting of a user device based on derived content, or outputting a recommendation of media content based on the contextual information, in accordance with some examples of the disclosure.

FIG. 3 shows a flowchart representing an illustrative process 300 for deriving contextual information 110 associated with a user, such as the derived contextual information 110 illustrated in FIG. 1. While the example shown in FIG. 3 refers to the use of system 100, as shown in FIG. 1, it will be appreciated that the illustrative process 300 shown in FIG. 3 may be implemented, in whole or in part, on system 100, system 200, and/or any other appropriately configured system architecture. For the avoidance of doubt, the term "control circuitry" used in the below description applies broadly to the control circuitry outlined above with reference to FIG. 2. For example, control circuitry may comprise control circuitry of the first user device 101, the second user device 112, or the server 104, working either alone or in some combination.

At 302, control circuitry, e.g., control circuitry of a server 104, a user device, or another user device determines a modification of a setting of a first user device 101. For example, it may be determined that a user has modified a setting of the first user device 101, such as the setting of a user interface of the first user device 101 (e.g., a modification of how the user interface appears to the user), or a setting relating to the appearance of the first user device 101 (e.g., physical appearance), or a setting relating to the operating system of the first user device 101. For example, the modification may be a selection of a theme which defines settings of the operating system of the first user device 101, such as visual settings of an interface of the first user device 101, or may be a change of a screensaver or wallpaper of the first user device 101. The modification may be any, or any combination of, a modification of the setting of an interface of the first user device 101, a modification of the setting of the appearance of the first user device 101, a modification of a setting of a physical configuration of the first user device 101, a selection of a wallpaper for the first user device 101, a selection of a screensaver for the first user device 101, a selection of a theme for the first user device 101, a selection of an audio file for a notification setting of the first user device 101, or a selection of an audio file for use with a virtual assistant.

At 304, control circuitry, e.g., control circuitry of a server 104, a user device, or another user device, derives contextual information 110 relating to the modification. The contextual information 110 may be derived using any appropriate process, such as image processing, computer vision processes, machine learning methods, classification methods, a machine learning model, an artificial intelligence, audio processing, a large language model (LLM model), object recognition processes, and so on, which is capable of extracting information, and/or may be derived from metadata relating to the modification, such as metadata related to an image or audio file involved with the modification. In an example, the modification may relate to an image selected by a user, for example, as a background or wallpaper of the first user device 101, where the selected image may be processed in order to derive the contextual information 110, or metadata related to the image may be retrieved (and in some examples processed, for example, in order to determine a general category to which the image belongs) to be used as or to determine the contextual information 110. The contextual information 110 may indicate a general category to which an aspect of the modified setting (e.g., selected image or audio file) belongs, and/or may indicate a particular element, or type of element, shown by an aspect of the modified setting. For example, contextual information 110 may comprise information (e.g., metadata) on a general category to which sounds, objects, people, animals, scenery, events, sounds, and so on, belong, or may provide information on the particular sounds, objects, people, animals, scenery, events, sounds, and so on, that are shown in or associated with the aspect of the modified setting (e.g., the selected image or audio file). The contextual information 110 may be associated with a user profile of the user. For example, the contextual information 110 may be set at a user profile so that the contextual information 110 may be accessed by any device with which the user profile is linked.

At 306, control circuitry, e.g., control circuitry of a server 104, the first user device 101, another user device, or a second user device 112, modifies a setting of a second user device 112 based on the derived contextual information 110. For example, the contextual information 110 may indicate a general category to which an aspect of the modified setting belongs, where a setting of the second user device 112 may be modified to be consistent with that general category (e.g., where the general category is "Christmas", the modification of LED lights of a second user device 112 may be to change the color of light output from the LED to red and green). In particular, an asset of the second user device 112, such as an image usable as a wallpaper, or a sound usable as a notification, may be identified as corresponding to the contextual information 110 (e.g., by comparison of metadata relating to images and/or sounds with the contextual information). An asset may be detected locally at the second user device 112, or may be detected at the first user device 101, another user device, or any server 104 or content database with which the second user device 112 is in communication. An asset corresponding to the contextual information 110 may then be used to modify the setting of the second user device 112, such as changing a wallpaper, or setting a notification sound. For example, where the contextual information 110 is "Christmas", an asset may be identified that is an image of Santa (e.g., where the image of Santa has corresponding metadata of "Christmas"). This image may then be set as a background on the second user device 112. In a further example, an asset may be identified which is an audio file of "sleigh bells" (e.g., where the audio file has corresponding metadata of "Christmas"). This audio file may be set as a notification sound of the second user device 112, such as a connection tone indicating a connection of the second user device 112 with another device. Thus, a setting of the second user device 112 may be modified based on the detected asset. The modification of the second user device 112 may be a modification of the setting of an interface of the second user device 112, such as a visual user interface (e.g., graphical user interface), an audio interface, or a modification of the appearance of the device, such as a setting of a physical configuration of the user device.

Alternatively or additionally to the modification of a setting of the second user device 112 based on the contextual information 110, a setting of the first user device 101 may be modified based on the contextual information 110, in a similar way as described in relation to the second user device 112. For example, the derived contextual information 110 may be used to determine assets of the first user device 101 corresponding to the contextual information 110 which may be used to modify additional settings of the first user device 101.

The contextual information 110 may be set at a user profile corresponding to the user, and may be accessed by devices connected to the user profile, for example, to modify settings of the additional devices based on the contextual information 110. The first user device 101 and the second user device 112 may be linked by the same user profile. For example, the first user device 101 and the second user device 112 may belong to, or be used by, the same user. For example, a user may "log in" to their user profile of an application on a second user device 112, where that user profile may be linked to a user profile of the first user device 101. In another example, the second user device 112 may be connected to a user device linked to a user profile, for example, where the first user device 101 is associated with a user profile, and the second user device 112 is connected to the first user device 101 (e.g., such as headphones connected via a Bluetooth connection).

In some examples, an operational theme may be determined based on the contextual information 110. For example, an operational theme may provide instructions for various settings of the user device, such as settings relating to the user interface with which a user may interact, in order that the settings correspond to the contextual information 110. For example, an operational theme may define particular colors, sounds, and images which correspond to the contextual information 110 to be used in particular settings of a user device (e.g., for a particular notification type, for a background, and so on), and may define a way in which the colors, sounds, and images are to be used in the settings or presented to the user. A developer (either a device manufacturer or an external party) may design or choose to create an operational theme (e.g., theme). For example, a user could create a Christmas "theme" using an application on a first device where they choose the tint of various user interface aspects (such as title bars for applications, background images for screens, notification sounds or other interactive "decorations" or elements (for example an animation overlay of snow falling). Interactive "decorations" may be defined by a theme and enabled on a per device basis by the device or application as specified by user settings. For example, a "snow falling" decoration is to be used, the display of the decoration could be triggered (if configured) when a user unlocks their phone, when they receive a text message or if enabled by an application when a user changes stories on a social media application. Snow falling animations across the entire user interface may animate when the home button is pressed or when a user scrolls to a "Christmas" category in a media subscription service, or a snow falling animation may fade when a user starts to scroll. On devices such as smart home assistants, the "voice" and phrasing may be adjusted to correspond to the contextual information. For example, a smart home assistant may use audio of the phrase "ho ho ho" before responding to user input, or bells may play in the background during a response in the normal assistant voice. Such themes may be stored and accessed as a pre-designed theme. For example, such a theme may be applied to a user device where the derived contextual information corresponds to the theme.

The operational theme may define settings of the second user device 112. For example, an operational theme determined based on the contextual information 110 obtained at the first user device 101 may define the configuration of settings of a second user device 112. The first and second user device 112 may apply the same operational theme. However, the operational theme may define different settings for the different devices. In particular, the operational theme may define settings which are appropriate for a particular device. For example, where a user device is a virtual assistant, and comprises no visual interface with which a user can interact in order to interact with the virtual assistant, the settings of the theme may define a voice with which the virtual assistant speaks, and may define the colors of lights provided on the virtual assistant. Where the user device comprises a visual user interface, such as a computer having a computer screen, the operational theme may define settings of the visual interface of the user device, such as defining an image for a wallpaper of the user device, and may define colors for features such as the taskbar. The application of a theme to additional devices associated with the user, such as the second user device 112, may be automatic (e.g., where the user has given permission for such alterations to be made).

In some examples, the operational theme is a predefined theme corresponding to the contextual information 110, or is generated based on the contextual information 110. For example, the theme may be a preset theme which is selected based on the derived contextual information 110 (e.g., a preset theme may be determined to be the closest match to the derived contextual information 110 from among a plurality of preset theme), or may be a theme which is generated based on the contextual information 110, for example, by using any appropriate processes, such as a trained model or machine learning process, to determine particular colors, sounds, and images as associated with the contextual information 110, and determine and configure settings of user devices which may use those colors, sounds, and images. In some examples, a representation of the modification (e.g., a representation of an operational theme) may be output to a user interface of a user device, so that a user can view the modifications which are to be applied to the user device(s). In some examples, the user may amend an operational theme (predetermined or generated). For example, the user may amend the particular colors which are to be used for settings of the devices, or select different images or sounds in place of those determined by the operational theme (in some examples the operational theme may provide an option for selection between various images, colors, and sounds, and so on, which correspond to the contextual information 110). The modification(s) may be applied responsive to receiving confirmation that the modification(s) is to be applied (e.g., responsive to receiving confirmation from the user).

In some examples, the operational theme is updated responsive to receiving additional information associated with the operational theme. (Alternatively or additionally, the contextual information 110 may be updated responsive to receiving additional information associated with the contextual information 110). For example, where the contextual information 110 relates to a particular television show (e.g., determined by a user setting a wallpaper related to a particular television show), the operational theme (or contextual information 110) may be updated based on the latest episode which has been broadcast. For example, an image set as the background for a device may be updated to show a scene in the latest episode which has been broadcast (or viewed by the user). The option to update the operational theme (or contextual information 110) may be presented to a user (e.g., may be output to a user interface of a user device, such as the first user device 101). The operational theme (or the contextual information 110) may be updated once confirmation is received that the operational theme is to be updated (e.g., once the user indicates that they would like the operational theme to be updated).

Alternatively or additionally to the step at 306, at step 308, control circuitry, e.g., control circuitry of a server 104, a user device, or another user device, outputs a recommendation of media content based on the contextual information 110. For example, media content that corresponds to the contextual information 110 may be recommended to the user (such as a TV show, a film, an ebook, music, a video game, an advertisement, and so on). Media content may be determined to correspond to the contextual information 110 by searching a media content store or service for media content with metadata corresponding to the contextual information 110. For example, the first user device 101 may be in communication with a media content server 104 and media content database, where the contextual information 110 may be used to search the media content database to detect media content corresponding to the contextual information 110. For example, where the contextual information 110 is "Christmas", and the media content service is a video streaming service, television shows and/or films comprising metadata of "Christmas" may be determined to correspond to the contextual information 110, and may be output to the user (device). In another example, in place of or in addition to the recommendation of media content, media content corresponding to the contextual information 110 may be output at a user device, such as the first user device 101, for example, by incorporating a song into a playlist. The media content recommended to the user may correspond to an operational theme determined based on the contextual information 110. For example, the media content may generally relate to the same topic as the contextual information 110. The recommendation of media content to the user may further comprise an option to receive updated information related to the media content.

In some examples, in place of or in addition to the step of determining a modification of a setting of a first user device 101, media content consumed by the user may be detected. For example, a TV show, or film, that is being watched or has been watched by the user may be detected. Contextual information 110 relating to the media content may be derived, for example, using automatic content recognition technology. Modification of settings of the first user device 101 and/or the second user device 112 may be made based on the derived contextual information 110, as is described above. For example, an operational theme may be applied that corresponds to the media content that is currently being consumed by the user. As is described above, the modification of settings may be updated based on the updating of the contextual information 110 or operational theme (e.g., by receiving additional information associated with the contextual information 110 or operational theme). For example, where the media content is a TV show, the contextual information 110 may relate to a particular episode of the show, where the contextual information 110 may be updated as the user progresses through the TV show. For example, the contextual information 110 may relate to the last episode, or a current episode, that a user is currently viewing. Thus, by receiving additional information on the most recently viewed part of a TV series, the settings may be modified accordingly (e.g., to include images, or music, which the user has recently viewed, or are related to content that the user has recently viewed, in the TV series). In some examples, a user device may provide an option to continue consuming the media content, for example, through a lock-screen of a user device, e.g., for a period of time after the user has paused the media content. For example, the theme may be deep-linked to a user's current viewing progress, so that a user may continue watching media content from outside a media streaming service, such as through the lock-screen. In another example, the continue watching option may be shown on another user device which is associated with the user. In a further example, a theme derived from contextual information relating to a video game may be dynamically updated based on a user's progress through the video game. In some examples, a user may purchase a theme, for example, a theme corresponding to media content such as a film may be purchased along with a purchase of the film, or in other examples, where media content is rented or purchased, a theme corresponding to the media content may be supplied by the service providing the media content.

In some examples, an option to add the recommended media content, and/or content related to the media content, to a user profile may be output to an interface of a user device (such as the first user device 101). For example, an option to add media content such as a TV show, film, music, and so on, or soundtrack corresponding to media content being consumed by the user, may be output (e.g., an option to add the media content to a user profile, purchase the media content, or rent the media content). The media content may be added to the user profile responsive to receiving confirmation that the media content is to be added.

In some examples, in place of or in addition to the step of determining a modification of a setting of a first user device 101 and using the modification to derive contextual information 110, data related to the user may be detected and used to determine the contextual information 110. For example, data may comprise any, or any combination of, a setting modified by a user, media content consumed by a user and/or linked to a user profile of the user, user history, a user preference (e.g., user preferences set at a user profile), location of a user, browser history of a user, an interest of a user, location of a user, a calendar event of a user, participation of a user in a group event, and so on.

In some examples, participation of a user in a group event may be detected. The contextual information 110 may be derived based on the group event, such as the type of group event. For example, the contextual information 110 may indicate the type of group event, the type of activity to which the group event relates, such as a sporting event, and so on. For example, where the group event is a plurality of users viewing a soccer game, the contextual information 110 may comprise information such as "soccer", and may indicate the teams playing. A setting of a user device is modified based on the derived contextual information 110. For example, a wallpaper of a user device may be modified to show a logo of a team playing in the sporting event (e.g., a logo of a team that the user supports), or images of players of a team playing in the sporting event (for example, a team supported by the user).

In some examples, contextual information 110 of another user, such as one also participating in a group event, may be used to determine the contextual information 110 for the user. For example, the contextual information 110 may be set based on contextual information 110 of another participant of a group event. In some examples, all participants of the same event may share contextual information 110 relating to the group event, so that user devices of a plurality of participants of a group event receive the same contextual information 110, so that their devices may be themed in the same way.

In any of the examples above, the contextual information 110 may be applied to any number of user devices. For example, all or a plurality of devices associated with a particular user (for example, as indicated by a user profile, a link to a device associated with a user, and so on), may be modified based on the contextual information in order that all the user's devices are consistently themed.

Figure 4:
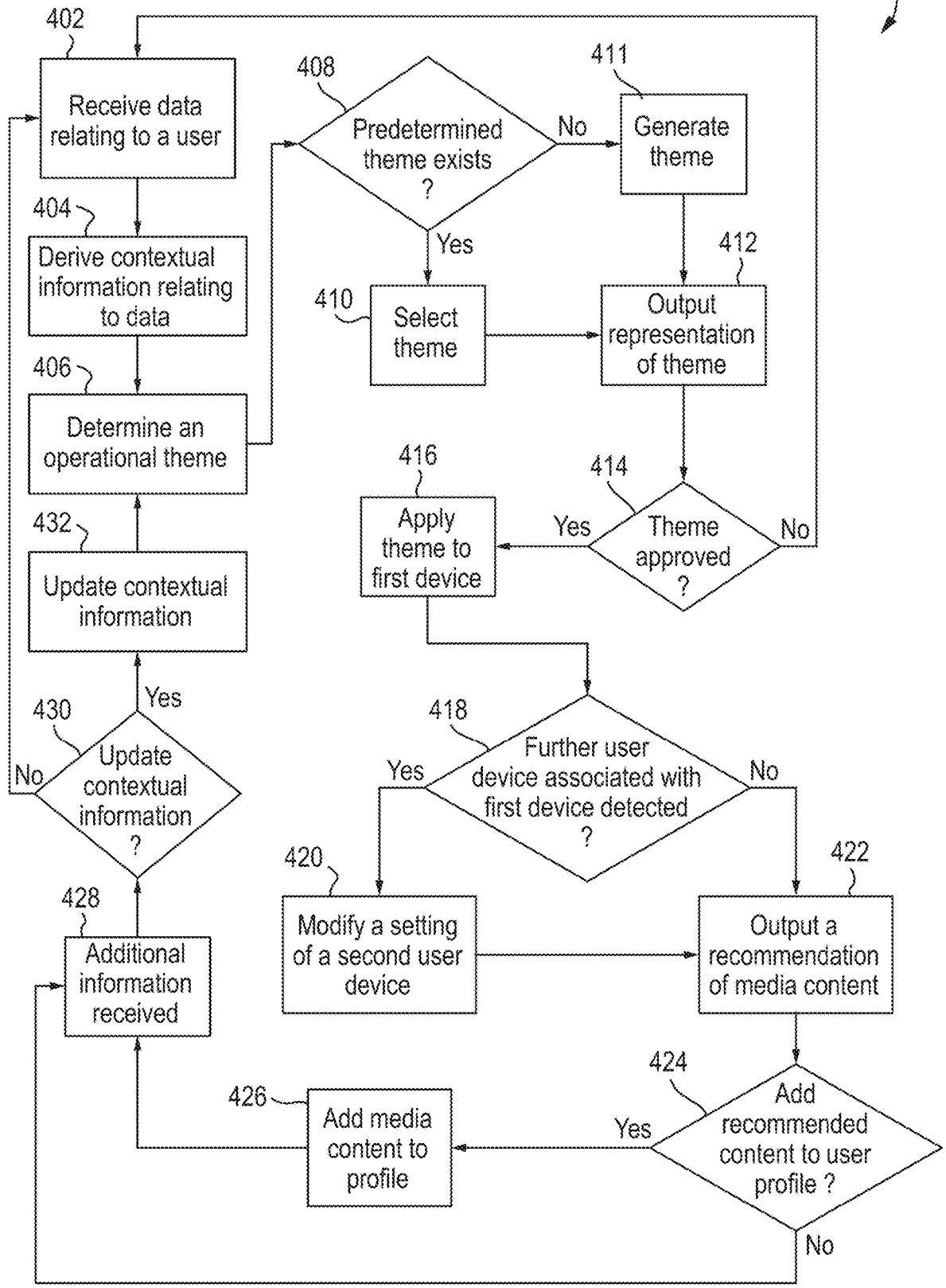
FIG. 4 illustrates modifying a setting of a user device based on derived content, and/or outputting a recommendation of media content based on the contextual information, in accordance with some examples of the disclosure.

FIG. 4 shows a flowchart representing an illustrative process 400 for deriving and using contextual information 110 relating to a user. While the example shown in FIG. 4 refers to the use of system 100, as shown in FIG. 1, it will be appreciated that the illustrative process shown in FIG. 4, may be implemented, in whole or in part, on system 100 and system 200, either alone or in combination with each other, and/or any other appropriately configured system architecture.

At 402, control circuitry, e.g., control circuitry of a server 104, the first user device 101, or another user device, receives data relating to the user. For example, the data may indicate a modification of a setting of a first user device 101. Alternatively or additionally, the data may comprise any of or any information related to media content consumed by the user, user history, user preference(s), location of a user, or participation in a group event.

At 404, control circuitry, e.g., control circuitry of a server 104, the first user device 101, or another user device, derives contextual information 110 relating to the received data. For example, the received data may be processed using any appropriate means, such as a computer vision process, image recognition and/or classification process, machine learning process, a trained model, and so on, to determine a general category to which the data belongs or is associated, and/or to determine a particular element or type of element derivable from the data.

At 406, control circuitry, e.g., control circuitry of a server 104, the first user device 101, or another user device, determines an operational theme based on the contextual information 110. For example, the operational theme may define settings of at least one user device which correspond to the contextual information 110, such as the use of particular images, sounds, and colors. In particular, at 408, it is determined whether a predetermined theme corresponding to the contextual information 110 exists. Where it is determined that a predetermined theme exists, (YES at step 408) an operational theme corresponding to the theme is selected at step 410. Then, at step 412, a representation of the theme is output to a user device, for example, so that a user may preview the modifications to settings that would be made upon application of the operational theme. Where it is determined that a predetermined theme does not exist, (NO at step 408), at 411, an operational theme is generated, for example, using colors, sounds and images corresponding to the contextual information 110. Then, the process moves to step 412.

Then, at 414, control circuitry, e.g., control circuitry of a server 104, the first user device 101, or another user device, determines whether the operational theme has been approved by the user. For example, a user may select an option to apply the theme of which they have viewed the representation. Where the theme is not approved (NO at step 414), the process moves back to step 402.

Where the theme is approved (YES at step 414), at 416, control circuitry, e.g., control circuitry of a server 104, the first user device 101, or another user device, applies the operational theme to the first user device 101. For example, settings of the user device may be modified as instructed by the operational theme.

At 418, control circuitry, e.g., control circuitry of a server 104, the first user device 101, or another user device, determines whether a further device associated with the first user device 101 has been detected.

Where a second user device 112 has not been detected (NO at step 418), at 422, control circuitry, e.g., control circuitry of a server 104, the first user device 101, or another user device, outputs a recommendation of media content corresponding to the contextual information 110. Where a second user device 112 has been detected (YES at step 418), at 420, control circuitry, e.g., control circuitry of a server 104, the first user device 101, or another user device, modifies a setting of the second user device 112 based on the contextual information 110 (e.g., based on the operational theme). The process then moves to step 422.

At 424, control circuitry, e.g., control circuitry of a server 104, the first user device 101, or another user device, determines whether the recommended media content is to be added to a user profile (e.g., it is determined whether the user has confirmed that the recommended media content is to be added to a user profile).

Where it is determined that the recommended media content is to be added (YES at 424), at 426, control circuitry, e.g., control circuitry of a server 104, the first user device 101, or another user device, adds the media content to the user profile. Then, at 428, control circuitry, e.g., control circuitry of a server 104, the first user device 101, or another user device, receives additional information related to the contextual information 110. Where it is determined that the recommended media content is not to be added (NO at 424), the process moves to 428.

At 430, control circuitry, e.g., control circuitry of a server 104, the first user device 101, or another user device, determines whether the contextual information 110 is to be updated based on the newly received information (e.g., whether a user profile is to be updated based on a user's approval). Where it is determined that the contextual information 110 is to be updated (YES at 430), at 432, control circuitry, e.g., control circuitry of a server 104, the first user device 101, or another user device, updates the contextual information 110, and the process moves to step 406. Where it is determined that the contextual information 110 is not to be updated (NO at 430), the process moves to step 402.

The actions or descriptions of FIG. 4 may be done in any suitable alternative orders or in parallel to further the purposes of this disclosure.

In some examples, at a first user device 101, a representation of a pre-designed (e.g., pre-defined) selection of themes (operational themes) may be output such that the user may choose from among the pre-designed themes. A chosen theme may then be applied to any additional device having, or linked to, the same user, for example, through a user profile, and using a cloud device management system. The theme may be customized by the user, for example, an option may be output to a user interface of the first user device 101 for the user to customize the theme. The theme may be customized by the user selecting from among pre-designed elements such as animations, notification sounds, background images, music categories, and/or movie categories to be associated with the theme. Once the user has completed any customization they desire, the contextual information 110 is derived, and/or set (temporarily in some cases) as an attribute on the user's profile or linked account, and in some examples, where available, assets (images, audio files, colors locations, URL descriptors, access or authorization tokens, and so on) corresponding to the theme defined at the first user device 101 may be included along with the contextual information 110. In some examples, the contextual information 110 is applied (e.g., pushed) to all compatible devices within the user's device management account (such as cloud service device management) where each additional device may then be configured (e.g., at each additional device) according to the contextual information 110 (and in some cases, the assets) to generate or select a "theme" for an additional device corresponding to the contextual information 110.

In some examples, a theme may define additional functionality for the user device. For example, additional settings may be configured for the user device by the theme. In some examples, where the theme relates to media content such as a video game, where the theme provides settings for, for example, backgrounds, wallpapers, notification sounds, and so on, the theme may additionally provide short cuts for a user to continue to interact with the media content (e.g., the game). In some examples, a short cut may be provided at an interface of the user device to enable a user to resume viewing of content.

Figure 5:
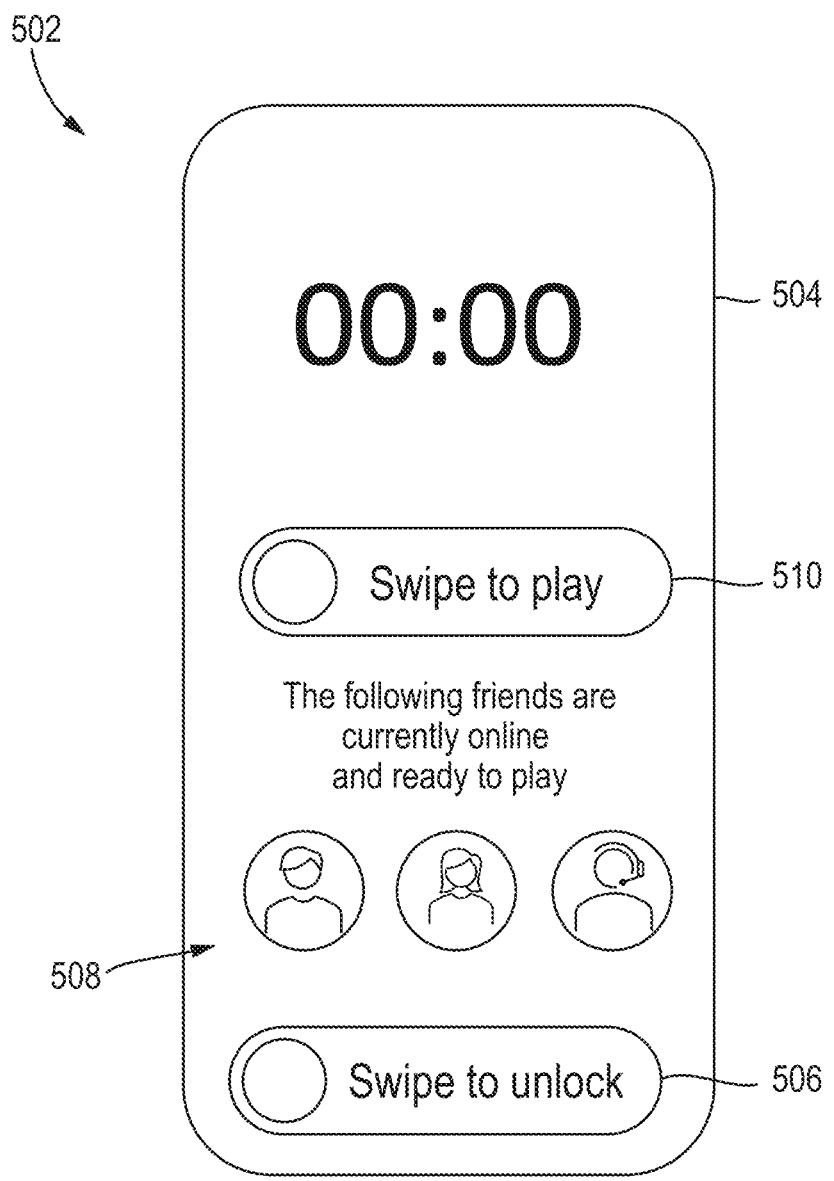
FIG. 5 illustrates an example of a user interface, in accordance with some examples of the disclosure.

FIG. 5 illustrates an example of a user device 502 to which a theme based on contextual information relating to a video game has been applied, comprising a user interface 504 showing a lock screen of the user device 502. In order to unlock the user device, the user may interact with a first swipe-bar 506 provided at the bottom of the screen. The lock screen of this example additionally provides information on users 508 of the video game known to the current user who are online, and are ready to play. A further option is provided for the user to directly access the video game, for example, via a second swipe-bar 510, which may open the video game at the current user device 502, or at another user device, such as a video game console.

Figure 6:
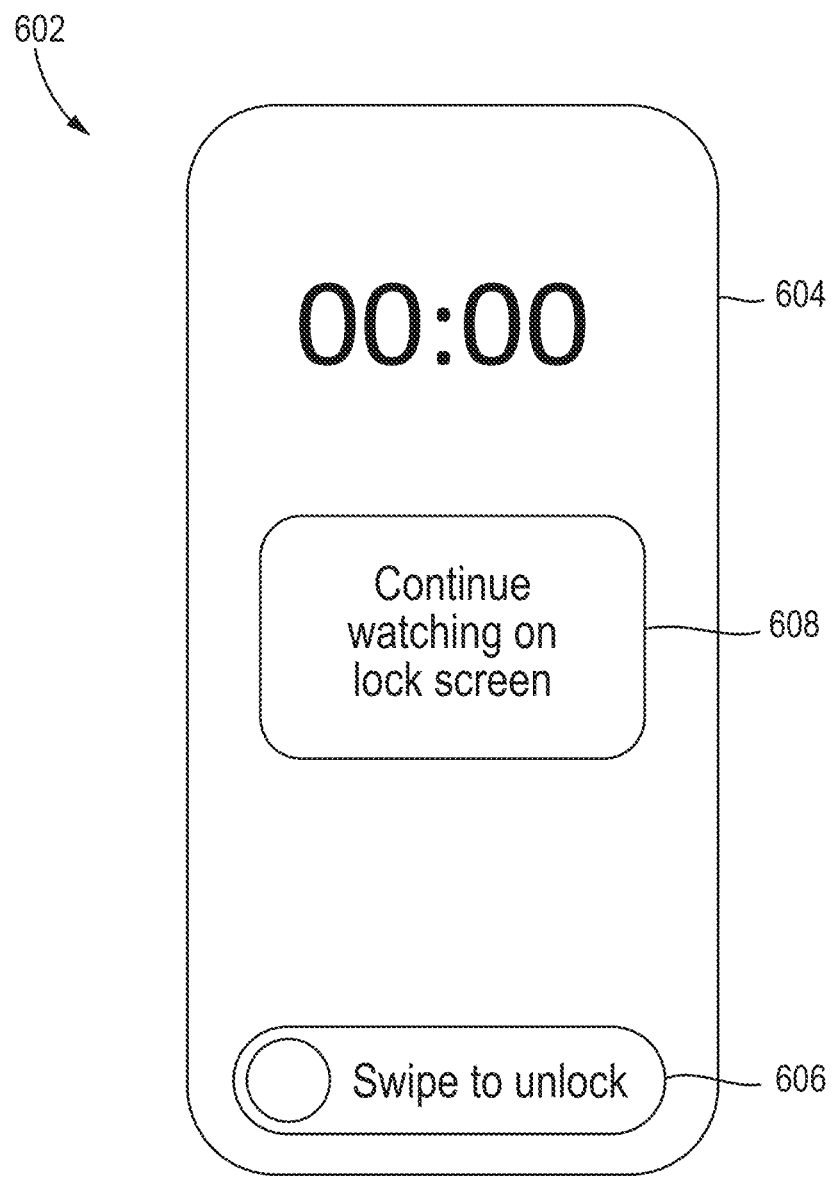
FIG. 6 illustrates an example of a user interface, in accordance with some examples of the disclosure.

FIG. 6 illustrates a further example of a user device 602 to which a theme based on contextual information relating to a film has been applied, comprising a user interface 604 showing a lock screen of the user device 602. In order to unlock the user device, the user may interact with a first swipe-bar 606 provided at the bottom of the screen. A further option is provided for the user to directly access the film in order to continue watching the film, for example, via a button 608 displayed on the lock screen which is selectable by the user. The user may select the button in order to continue to watch the content through the lock screen (e.g., without unlocking the user device 602).

Figure 7:
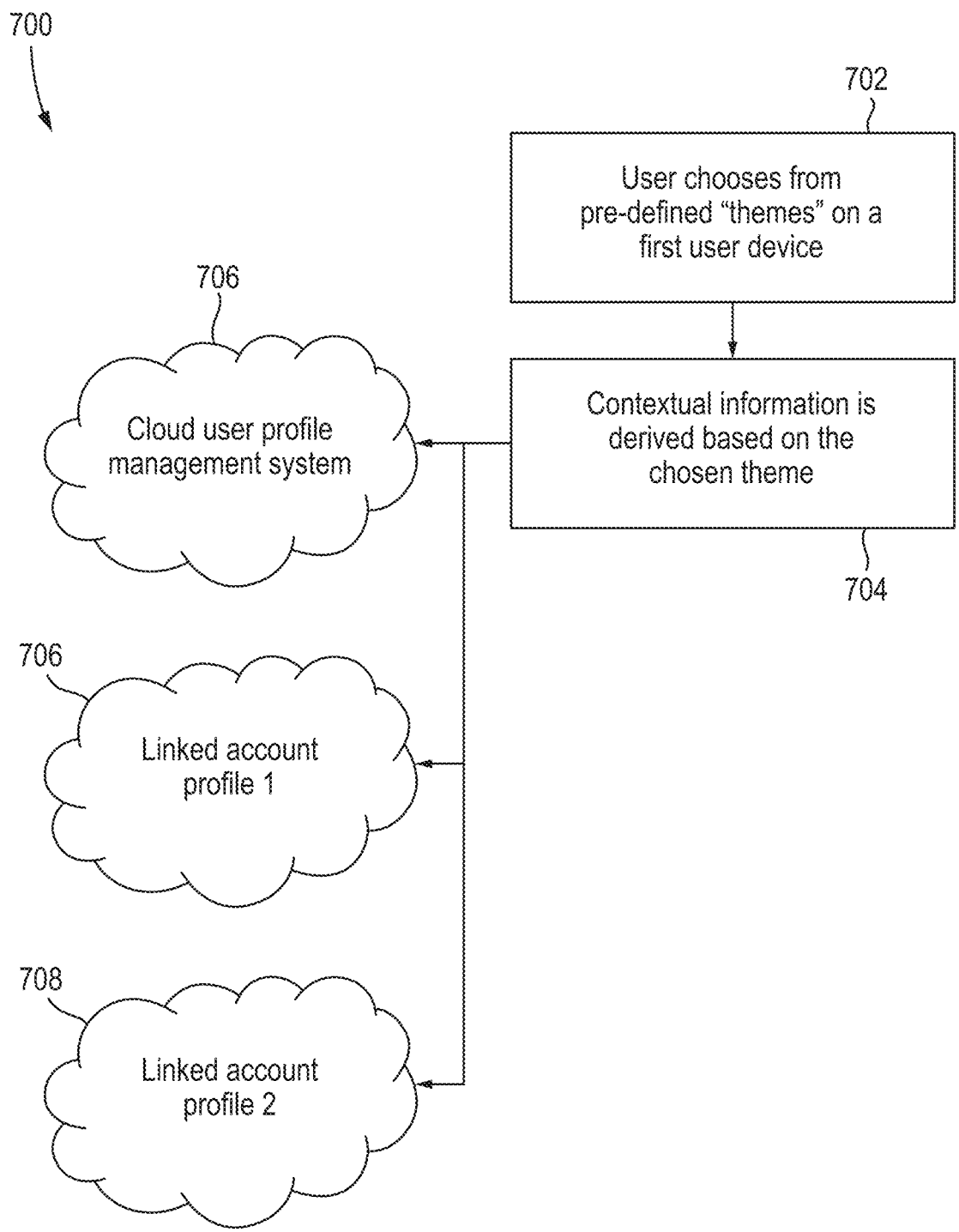
FIG. 7 is a flowchart representing a process for deriving contextual information, in accordance with some examples of the disclosure.

FIG. 7 is a flow chart illustrating an example process 700 of propagation of contextual information 110 to a user profile based on a user selection of a theme. In particular, FIG. 7 illustrates a first step 702 in which a user chooses from a pre-defined theme on a first user device 101, for example, from a plurality of pre-defined themes. Then, in a second step 704, contextual information 110 is derived based on the chosen theme. The contextual information 110 is then applied to a user profile and set at a cloud user profile management system 706, along with a first linked account profile 706 and a second linked account profile 708.

Figure 8A:
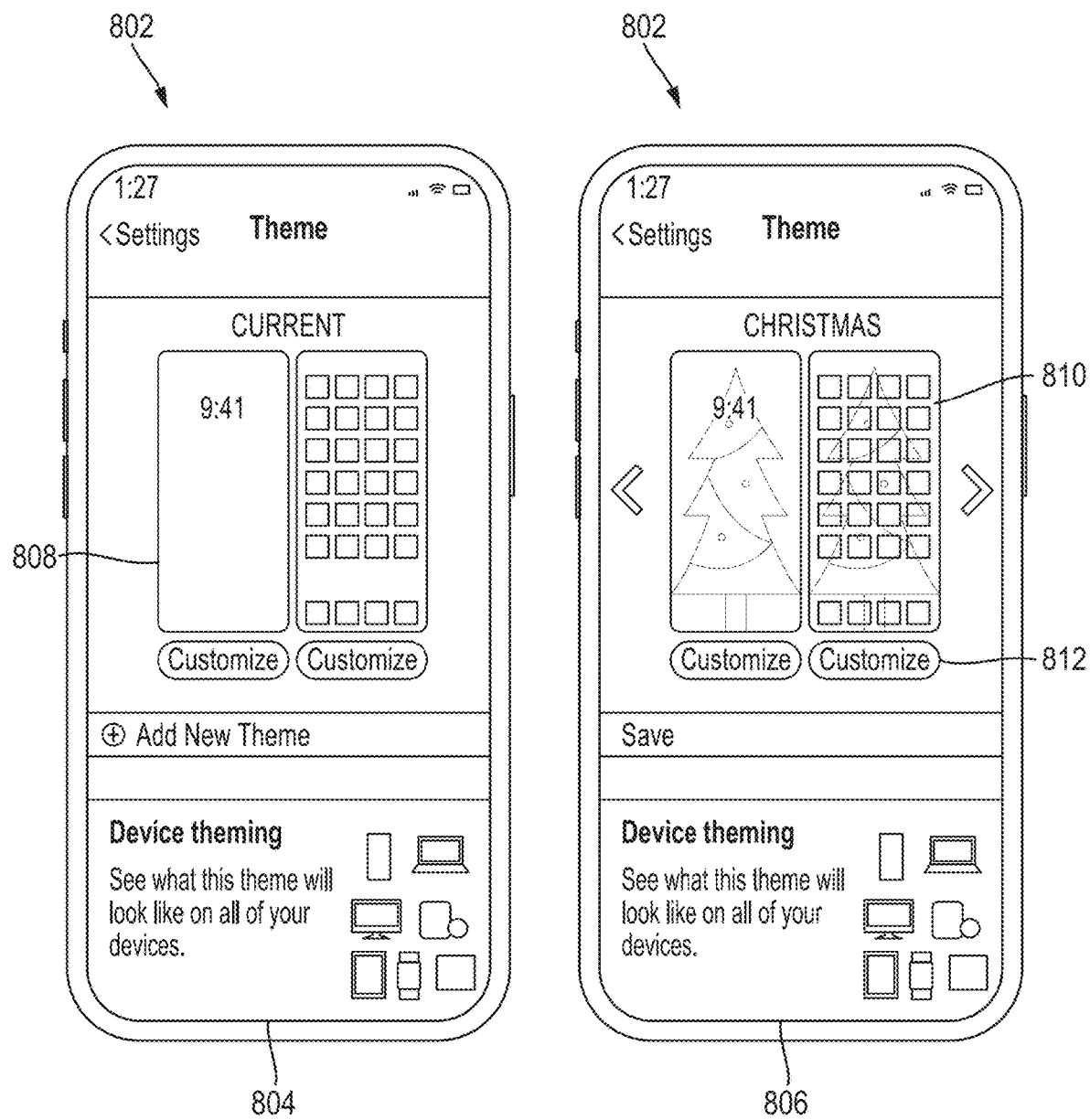
FIGS. 8A, 8B, and 8C illustrate previewing the modification of user devices, in accordance with some examples of the disclosure.
Figure 8B:
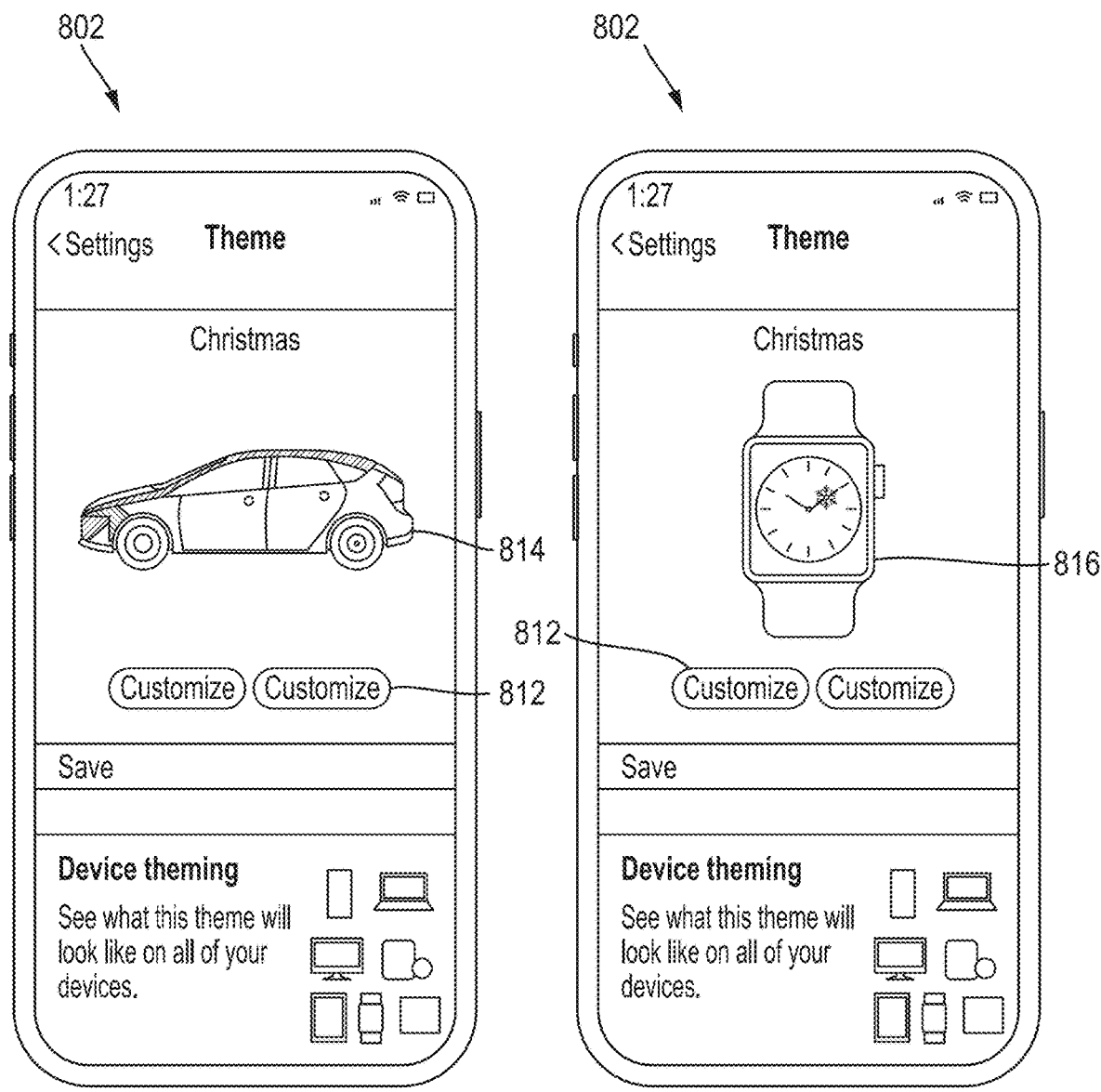
Figure 8C:
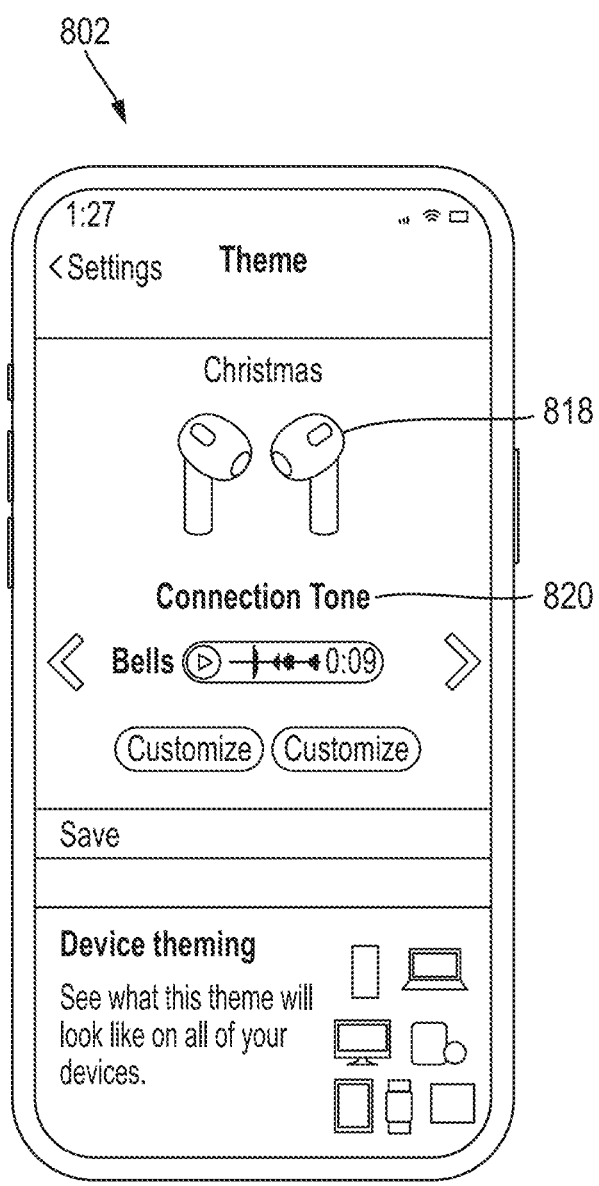

FIG. 8A-8C illustrate examples of user selection of a theme according to the examples herein. In particular, FIG. 8A illustrates a user device 802 (in this example, a smartphone), and in particular illustrates a graphical user interface 804 of the user device 802 showing a preview of a "theme" to be applied to the user device. As is shown on the left hand side of FIG. 8A, the display settings of the graphical user interface 804 of the user device 802 prior to setting of the theme is shown. For example, the current theme 808 of the user device 802 is shown, such as the current background setting of the user device. On the right hand side of FIG. 8A, a preview of the display settings of a graphical user interface 806 of the user device 802 having a theme 810 applied is shown (in this particular example, a Christmas theme). As is shown in this example, the user is provided with an option to customize the theme 812 by altering the settings suggested by the theme, for example, by selecting particular colors, or images, within the purview of the theme. The user may also be provided with an option to preview the theme 811 as it would appear on a plurality of devices (e.g., different devices, or types of devices, such as a computer screen, smartwatch, smart speaker, tablet, and so on). The interface may therefore provide an option for switching the view between different devices in order to preview the theme on different devices.

FIG. 8B illustrates a further example of a selection of a theme applied to devices other than the device on which the theme is previewed (e.g., propagation of the theme to additional devices). In particular, FIG. 8B illustrates, on a graphical user interface 804 of the user device 802, a preview of a "theme" as it would appear when applied to settings of a further user device. As is shown on the left hand side of FIG. 8B, the further device is a vehicle 814, where the application of a "theme" to the settings of the vehicle modifies a skin of the vehicle (e.g., skin modified using e-ink technology). In this example, the application of settings corresponding to the theme of "Christmas" modifies the color of the skin of the vehicle so that some panels turn red, and others turn green (illustrated here as differently shaded panels which correspond to different colors). As is shown on the right hand side of FIG. 8B, the further device is a smart watch 816. The application of a theme to the smart watch modifies the face of the watch to display an image corresponding to the "Christmas" theme. As is described above in relation to FIG. 8A, the user interface of the user device may provide an option for a user to customize the theme by altering settings suggested by the theme.

FIG. 8C a further example of a selection of a theme applied to devices other than the device on which the theme is previewed. In particular, FIG. 8C illustrates, on a user device 802, a preview of a "theme" as it would appear when applied to settings of a further user device. The further device of this example is a pair of earphones 818, where application of a theme to the settings of the pair of earphones 818 modifies a connection tone 820 of the earphones 818 (e.g., indicating pairing of the earphones 818 to the user device 802). In this example, the application of settings corresponding to the theme of "Christmas" modifies the connection tone 820 of the earphones 818 to an audio file comprising bells (e.g., sleigh bells). As is described above in relation to FIG. 8A, the user interface of the user device may provide an option for a user to customize the theme by altering settings suggested by the theme.

In the examples shown in FIGS. 8A-8C, it is illustrated that a "theme" determined based on contextual information 110 (e.g., which is set at a user profile) may be propagated to a plurality of user devices, where the settings of the user device may be altered in different ways for different devices. For example, for some devices, the user interface may be modified to correspond to the theme. For other devices (and/or for other aspects of the same devices), the physical appearance of the device may be modified to correspond to the theme, for example, by modifying the appearance of a skin of a device, or by altering the color of lights on a device. Similarly, on some devices, audio output may be modified to correspond to the theme, such as connection notifications, or alert notifications.

In some examples, a user may select an image as a background or wallpaper on a first user device 101, such as a smartphone. Contextual information 110 relating to the image may then be derived (such as via image recognition or via metadata accompanying the chosen image). The derived contextual information 110 may then be set (temporarily in some cases) as an attribute on the user's profile or linked account and pushed to all compatible devices within the user's device management account (such as cloud device management) where each device may apply a theme (e.g., an operational theme) corresponding to the contextual information 110. The contextual information 110 may comprise multiple values (e.g., may be a multi-value attribute), such as multiple terms relating to the image. For example, in the examples shown in FIG. 1, the terms may be "Christmas tree" and "Christmas". In the case where multiple values are assigned, there may be a weight assigned corresponding to the degree of certainty that the image recognition or classification system determines for the contextual information 110 value for the given image.

Figure 9:
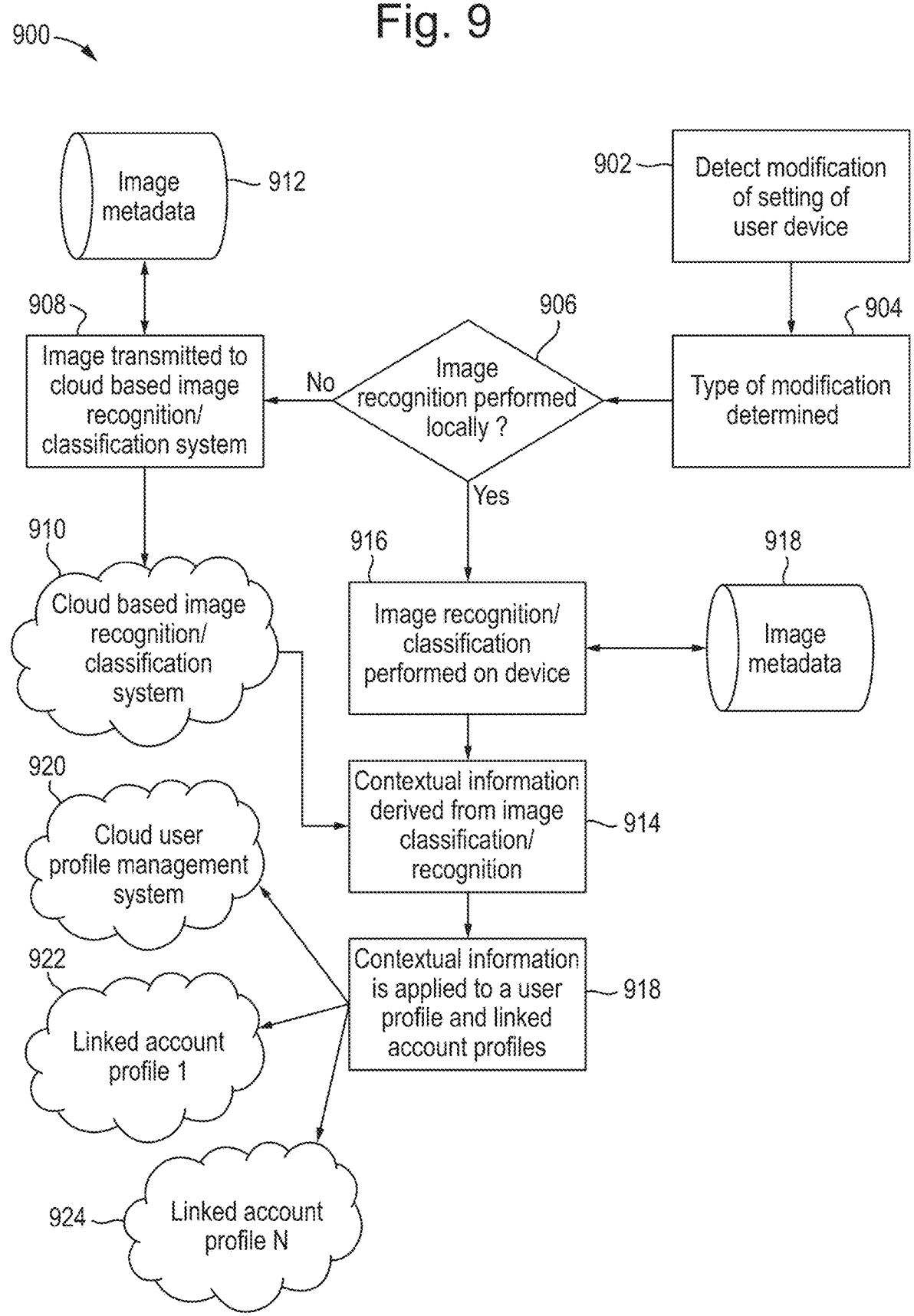
FIG. 9 is a flow chart representing a process for deriving contextual information, in accordance with some examples of the disclosure.

FIG. 9 illustrates an example of a process 900 deriving contextual information 110 from a user selected image. In particular, FIG. 9 illustrates an example of deriving contextual information 110 from a user selected image such as an image chosen as a background, wallpaper, or profile representation, and associating the derived contextual information 110 attribute with a user profile across linked or associated devices.

At step 902, the modification of a setting of a user device is detected, for example, a modification comprising a selection of an image used as background, wallpaper, or profile representation made by a user. Then, at step 904, the type of modification is determined as a modification of an image to display within a user interface. It is determined that the type of modification is a change of image. It is then determined at step 906 whether image recognition is to be performed locally. Where it is determined that the image recognition is not to be performed locally (NO at step 906), at step 908, it is determined that the image is to be transmitted to a cloud-based image recognition or classification system. The image is then transmitted to a cloud-based image recognition/classification system 910, along with image metadata 912. The image (and metadata) is then processed using image recognition and/or classification processes to determine contextual information 110 relating to the image at step 914. Where it is determined at step 906 that the image recognition is to be performed locally (e.g., at the user device), at step 916, the image (along with image metadata 918) is processed at the user device using image recognition and/or classification processes to determine contextual information 110 relating to the image. Once the contextual information 110 has been derived, the contextual information 110 is applied to a user profile at step 918. In particular, the contextual information 110 may be applied by a cloud user profile management system 920, and may be linked to user account profiles, such as account profile 1 922 and account profile N 924.

In some examples, a user device may not comprise a visual user interface. For example, where the user device is a smart home assistant or smart speaker, the user device may comprise an audio user interface in place of a visual user interface. In this case, the use of the derived contextual information 110 may result in a change in the settings of the device such as the audio output of the device. For example, if the contextual information 110 relating to a user indicates "Christmas", the device may modify settings of the user device so that a different "voice" is used to present audio output to converse with the user such as the voice of "Santa Claus", alter or add phrasing such as "Ho Ho Ho" spoken before a response is given, or add background audio elements such as the jingling of bells or the sound of wind played during a response. While in this example, the user device only comprises an audio user interface, it will be appreciated that a user device may comprise both an audio user interface and a visual user interface, where modifications to the setting of either and/or both of the user interfaces may be made based on the contextual information 110.

Figure 10A:
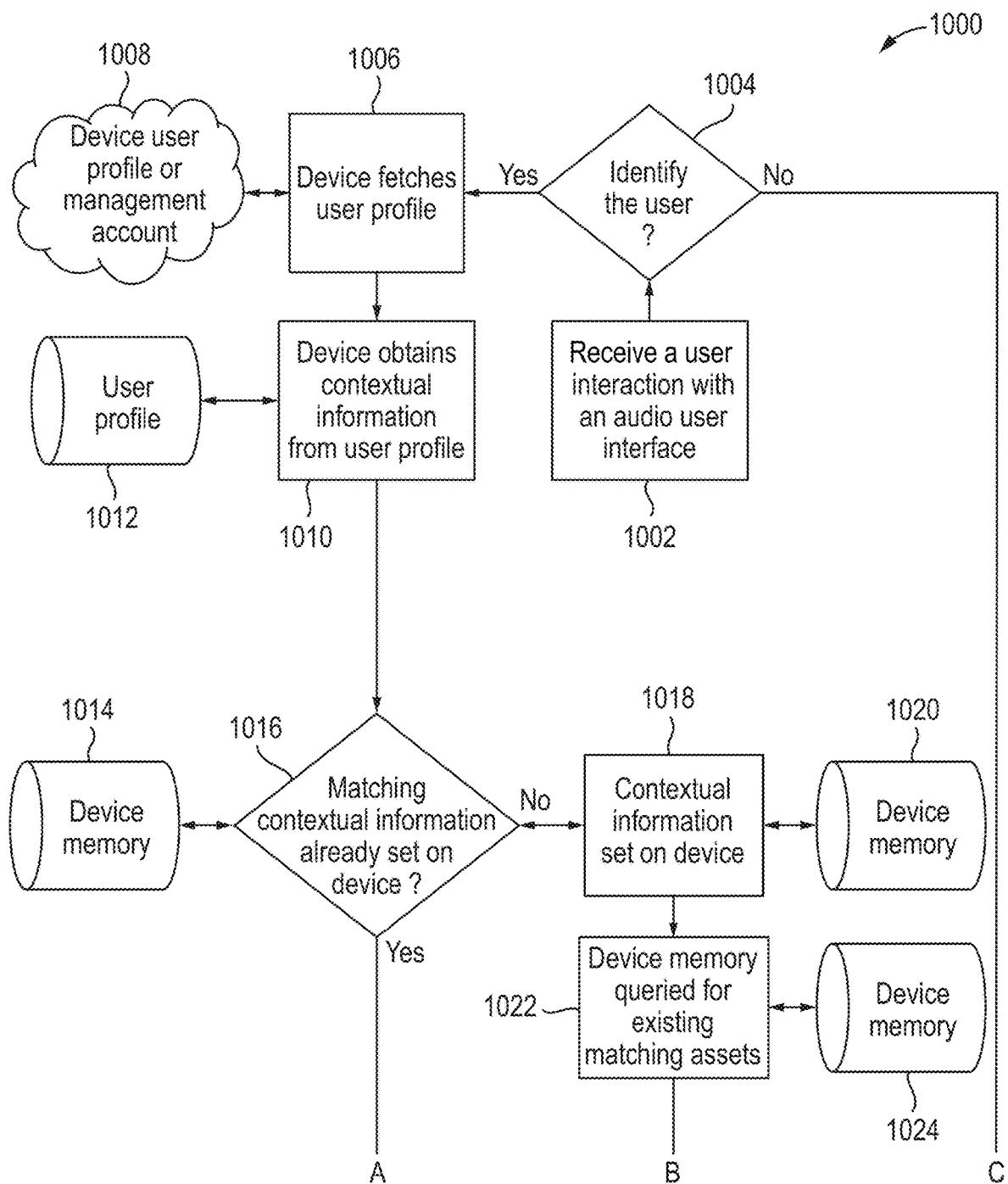
FIGS. 10A and 10B show a flowchart representing a process for modifying a user device based on contextual information set at a user profile, in accordance with some examples of the disclosure.
Figure 10B:
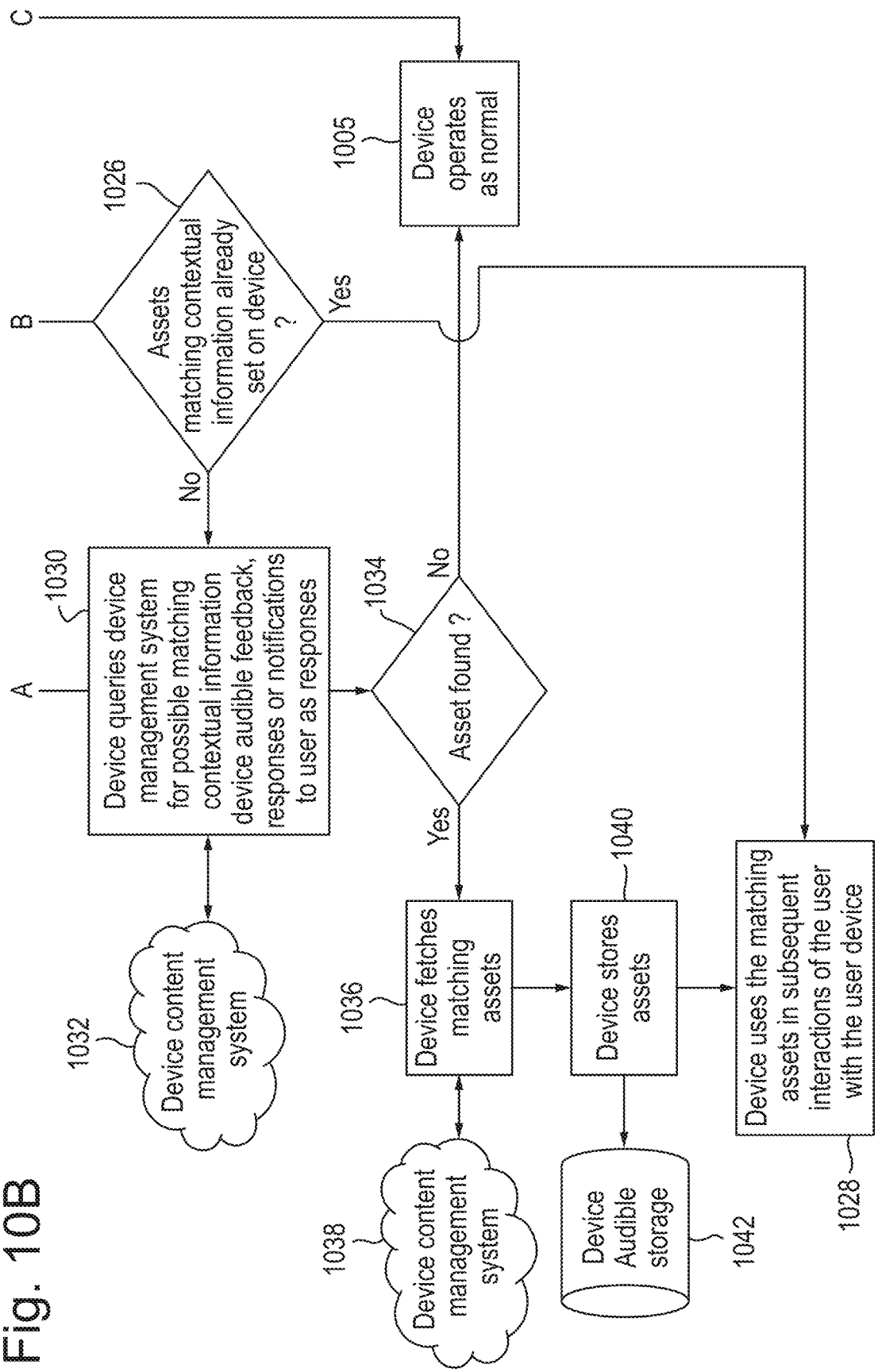

FIGS. 10A and 10B are an example of a process 1000 of modifying the settings of a user interface where the user interface is an audio user interface. In particular, in step 1002, an interaction of a user with a user device comprising an audio user interface is received. For example, the user device may comprise an audio user interface configured to provide audible feedback and/or responses. Then, at step 1004, an attempt is made to identify or detect the user who has interacted with the audio user interface. For example, the user may be determined using voice recognition to identify the user. Where it is not possible to identify the user (NO at step 1004), the process moves to step 1005, and the device operates as normal. Where it is possible to identify the user (YES at step 1004), at step 1006, the user device fetches a user profile corresponding to the identified user by communicating with a device user profile or management account 1008. Once the user profile has been detected, at step 1010, the device obtains contextual information 110 from the user profile 1012. Then, at step 1016, the user device queries internal storage of the user device (device memory 1014) to determine if the obtained contextual information 110 matches contextual information 110 already set at the user device. Where it is determined that matching contextual information 110 is not already set on the user device (NO at step 1016), at step 1018, the obtained contextual information 110 is set as the contextual information 110 at the user device, for example, in the device memory 1020. Then, at step 1022, the device memory 1024 is queried for existing assets (e.g., feedback responses, notification content) that match the contextual information 110. At step 1026, it is determined whether assets (e.g., audible feedback responses, notification content, etc.) matching the contextual information 110 are already set at the user device. Where the assets are already set at the user device (YES at step 1026), at step 1028, the user device uses the matching assets in subsequent interactions of the user with the user device (e.g., plays matching audible feedback, notification content as appropriate). Where the assets matching the contextual information 110 are determined to not be already set on the user device at step 1026, or where matching contextual information 110 is already set at the user device at step 1016, the process moves to step 1030, where the user device queries a device content management system 1032 for possible matching contextual information 110 device assets (audible feedback, responses or notifications to use as responses). Then, at step 1034, it is determined whether an asset has been detected. Where an asset has not been detected (NO at step 1034), the process moves to step 1005, and the user device operates as normal. Where an asset has been detected (YES at step 1034), at step 1036, the user device fetches assets matching the contextual information 110 from a device content management system 1038. Then, at step 1040, the device stores assets (audible feedback, notification content) for re-use at device audible storage 1042. The process then moves to step 1028, where the device uses the matching assets in subsequent interactions of the user with the user device.

In some examples, the user device may comprise the ability to change its appearance. For example, a user device (such as a smart assistant) may comprise lights, such as LEDs, the colour of which may be altered. Contextual information 110 may be used to alter settings of the user device in order to change the colours or patterns of LED lights of the user device. For example if the contextual information 110 associated with a user's profile or linked account is "Christmas", the device may alter the LED color to red and green, or cause the color of the lights to be configured in a particular, pattern, such as red and white (e.g., representing a candy cane), or may turn on and off (blink) in a white snowflake pattern, e.g., during a response of the user device to a query presented by the user, or when the user's profile is detected, for example, after a particular user has spoken a "wake" word to engage the user device, and the user device has performed voice recognition in order to identify the user.

Figure 11A:
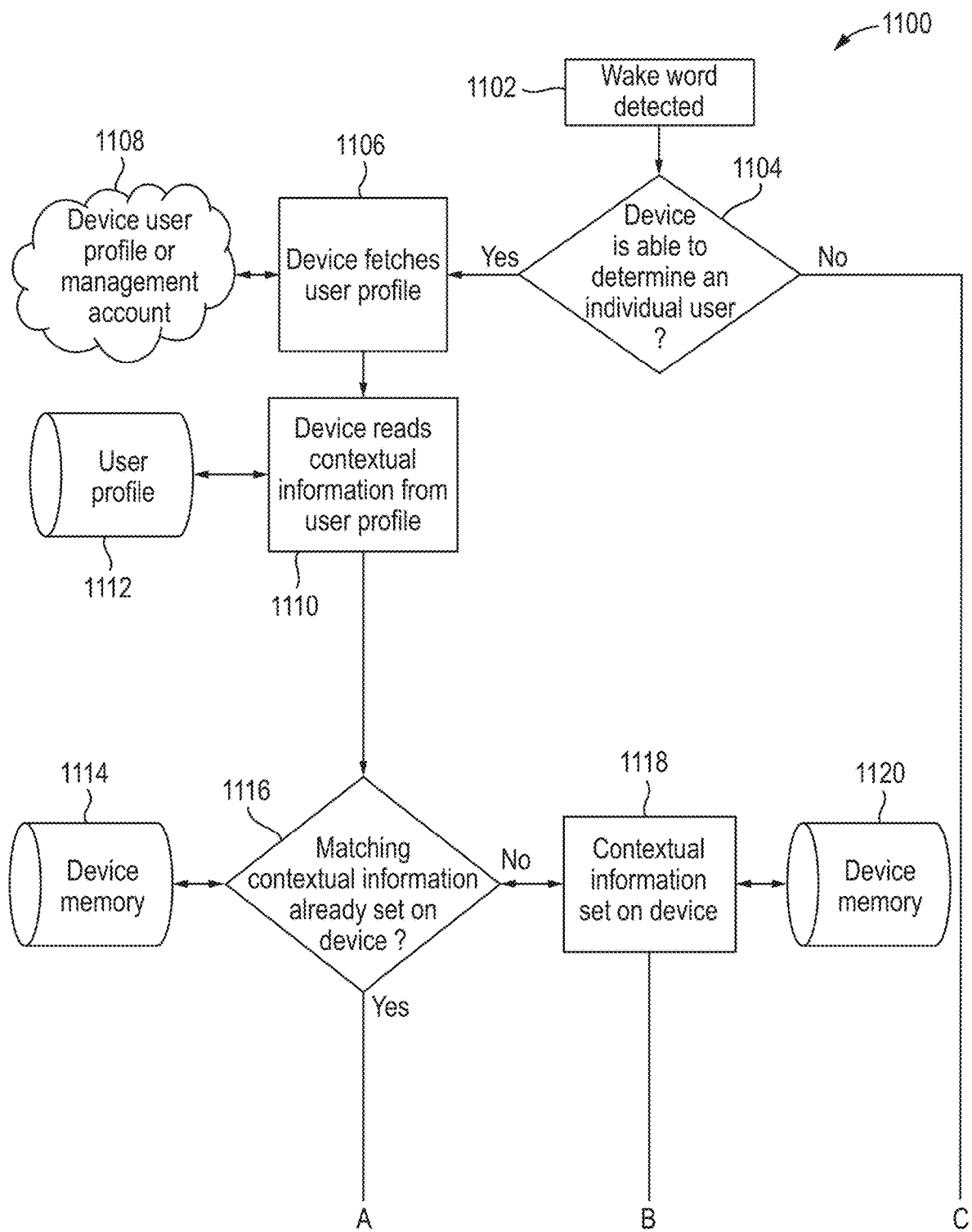
FIGS. 11A and 11B show a flowchart representing a process for modifying a user device based on contextual information set at a user profile, in accordance with some examples of the disclosure.
Figure 11B:
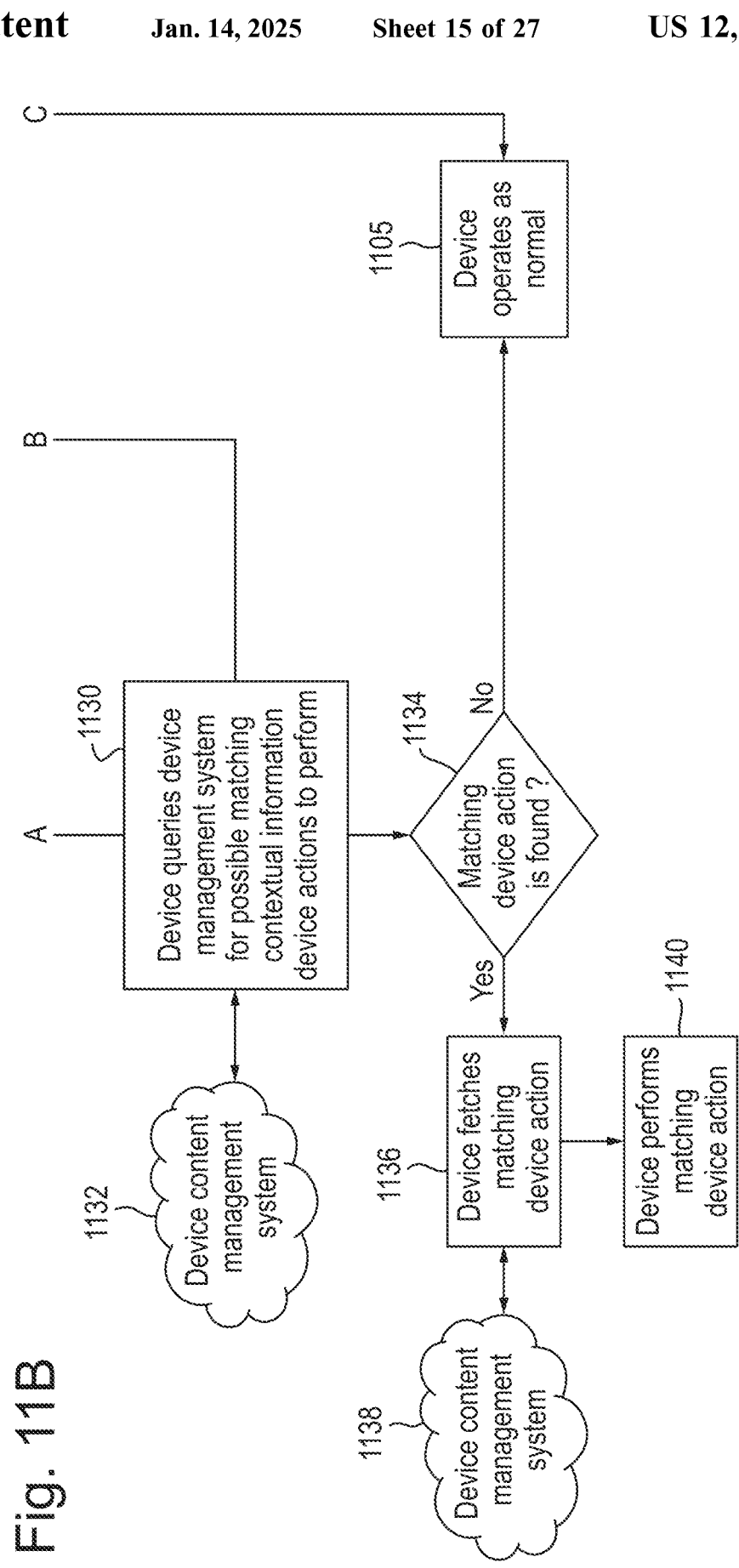

FIGS. 11A and 11B are an example of a process 1100 of modifying the settings of relating to the physical appearance of the user device. In particular, in step 1102, an interaction of a user with a user device comprising an audio user interface is received. For example, the user device may comprise an audio user interface configured to provide audible feedback and/or responses. In particular, a "wake word" is detected (e.g., the user triggers the user device to "wake" by use of a "wake word"). Then, at step 1104, an attempt is made to identify or detect the user who has interacted with the audio user interface. For example, the identity of the user may be determined using voice recognition. Where it is not possible to identify the user (NO at step 1104), the process moves to step 1105, and the device operates as normal. Where it is possible to identify the user (YES at step 1104), at step 1106, the user device fetches a user profile corresponding to the identified user by communicating with a device user profile or management account 1108. Once the user profile has been detected, at step 1110, the device obtains contextual information 110 from the user profile 1112. Then, at step 1116, the user device queries internal storage of the user device (device memory 1114) to determine if the obtained contextual information 110 matches contextual information 110 already set at the user device. Where it is determined that matching contextual information 110 is not already set on the user device (NO at step 1116), at step 1118, the obtained contextual information 110 is set as the contextual information 110 at the user device, for example, in the device memory 1120. Then, the process moves to step 1130, where the user device queries a device content management system 1132 for possible matching contextual information 110 device actions to perform (e.g., to change the physical configuration of the device). The process also moves to step 1130 where the matching contextual information 110 is already set on the user device (YES at 1116). Then, at step 1134, it is determined whether a matching device action has been found. Where a matching device action has not been detected (NO at step 1134), the process moves to step 1105, and the user device operates as normal. Where a matching device action has been detected (YES at step 1134), at step 1136, the user device fetches the asset required to perform the device action matching the contextual information 110 from a device content management system 1138. Then, at step 1140, the device performs the matching device action (e.g., changes the colour or on/off configuration of lights of the device, changes the colour of the skin of the device, and so on).

In some examples, the contextual information 110 (or a theme derived using the contextual information 110) associated with a user may be used to configure notifications of a user device corresponding to the user. An example of a user is an authorized user, who may not be the user holding the account, but may be authorized to use the account. For example, an authorized user may order items from an online shopping website When the ordered item arrives, the notification that indicates the arrival of the item may use the contextual information 110, or theme, currently corresponding to that user (e.g., linked to that user's user profile) to determine how the notification should be presented to the user. For example, audible and light settings may be configured based on the contextual information 110, or theme, associated with the user. Additionally, if an authorized user uses, for example, an application, which is unique for that user (e.g., unique to an authorised user of an account, such as not used by any other user associated with the user account), such as a particular news channel, any notifications corresponding to that news channel may be configured based on the contextual information 110 relating to the user, or a theme which is set based on the contextual information 110. If there is a conflict in notifications, where multiple authorized users of the same user account are subscribed to the same notification, the account owner may determine which theme is to be prioritized for presenting the notification.

In some examples, a user device such as a vehicle (e.g., a car), may have the ability to alter its interior lighting scheme and/or its exterior colour of pattern (for example, where the "skin" of the car uses e-ink). These parameters may be modified to may reflect the contextual information 110 accordingly. The vehicle may be configured to determine the identity of the driver (user) of the car (e.g., via proximity, user selection, facial recognition, proximity of a user device associated with the user, and so on), and the appearance of interior lighting and or exterior coloration/patterning may change to correspond to contextual information 110 which is associated with a user profile of the driver. A link to a user profile may be created via a skill (e.g., an added skill which uses APIs to enable additional functions for the user device) when a user device belonging to or associated with the user is connected to the vehicle via a connection service e.g. using Bluetooth of Wi-Fi technologies, where the user's profile and contextual information 110 attribute may be transmitted to or retrieved by the vehicle from the connected user device.

Figure 12A:
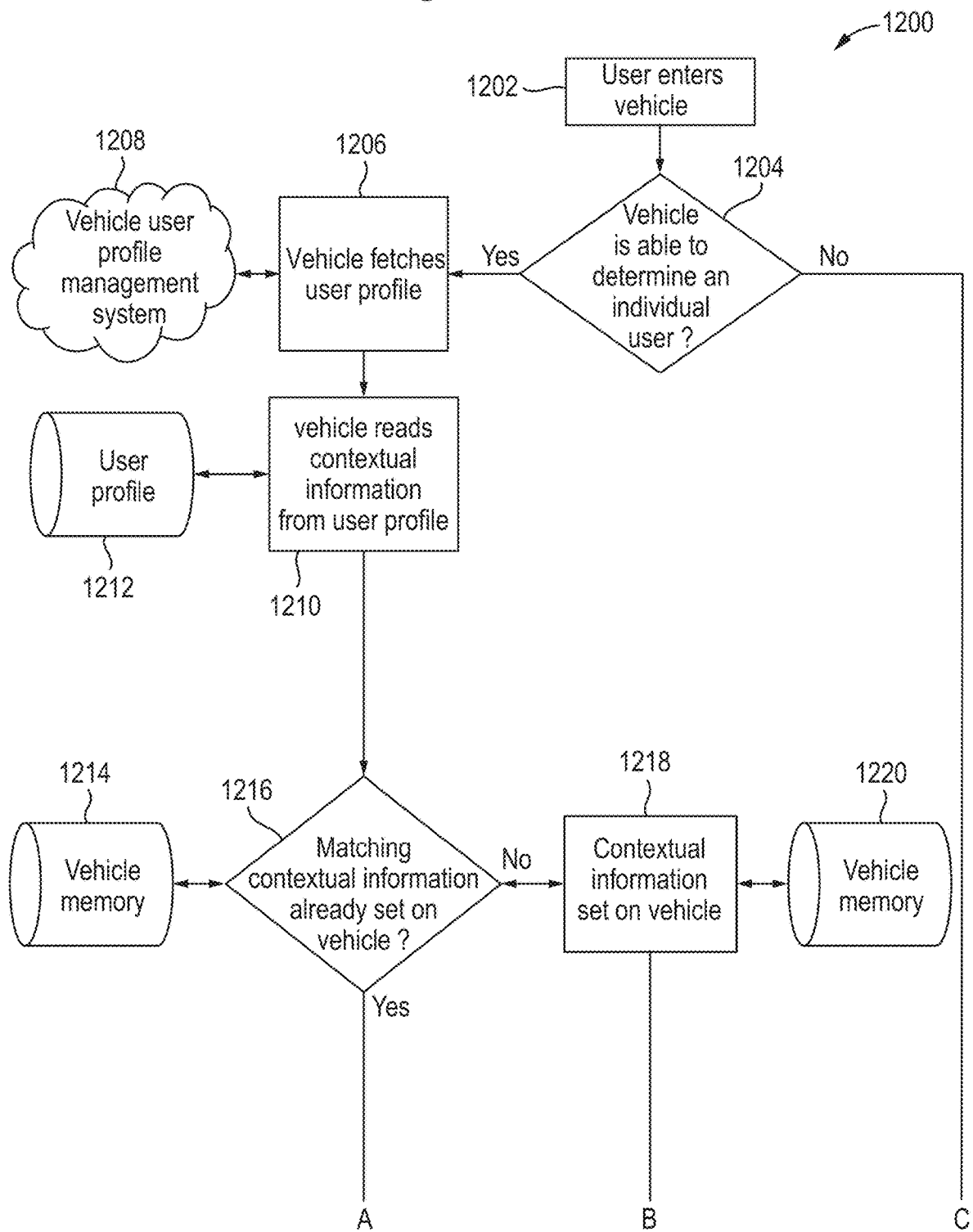
FIGS. 12A and 12B show a flowchart representing a process for modifying the settings of a vehicle based on contextual information set at a user profile, in accordance with some examples of the disclosure.
Figure 12B:
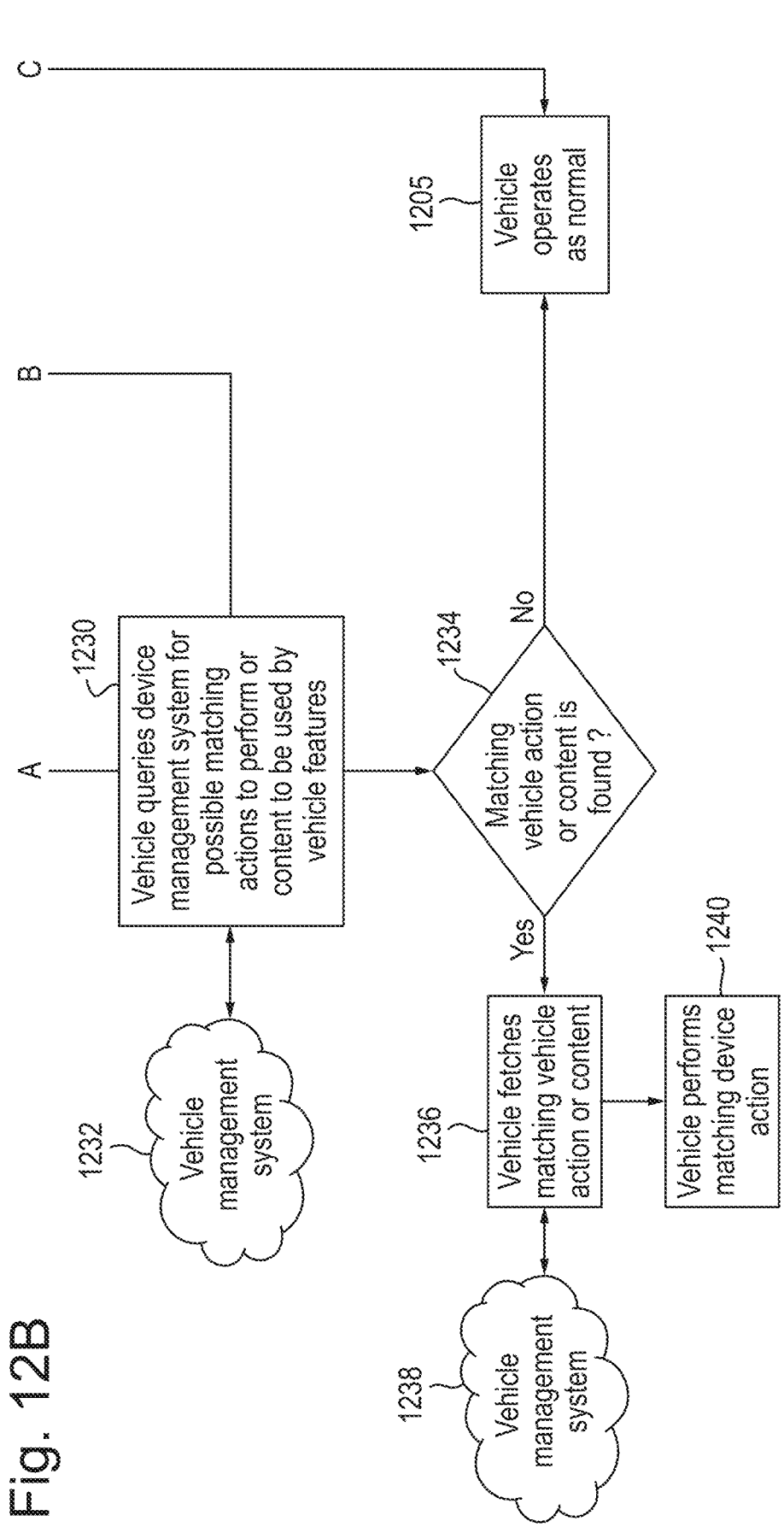

FIGS. 12A and 12B are an example of a process 1200 of modifying a vehicle (user device) to correspond to contextual information 110. In particular, in step 1202, it is determined that a user has entered the vehicle. For example, it may be determined that a user has entered the vehicle by any type of sensor, such as a motion sensor, by detecting the opening of the door of a vehicle, by detecting the presence of the user in a seat of the vehicle (e.g. using pressure sensors) using facial recognition, for example, using a driver facing camera which is paired to the vehicle, by the user interacting with controls of the vehicle, such as turning on the engine, and so on. Then, at step 1204, an attempt is made to identify the user who has entered the vehicle. For example, the user may be determined using facial recognition, voice recognition, the proximity of a user device associated with a user to a vehicle, and so on. Where it is not possible to identify the user (NO at step 1204), the process moves to step 1205, and the vehicle operates as normal. Where it is possible to identify the user (YES at step 1204), at step 1206, the vehicle fetches a user profile corresponding to the identified user by communicating with a vehicle user profile management system 1208. Once the user profile has been detected, at step 1210, the vehicle obtains contextual information 110 from the user profile 1212. Then, at step 1216, the vehicle queries internal storage of the vehicle (vehicle memory 1214) to determine if the obtained contextual information 110 matches contextual information 110 already set at the vehicle. Where it is determined that matching contextual information 110 is not already set at the vehicle (NO at step 1216), at step 1218, the obtained contextual information 110 is set as the contextual information 110 at the vehicle, for example, in the vehicle memory 1220. Then, the process moves to step 1230, where the vehicle queries a vehicle management system 1232 for matching actions to perform or content to be used by vehicle features (e.g., changes to software or hardware, such as changing interior lighting, door opening sounds or exterior e-ink colors or patterns). The process also moves to step 1230 where the matching contextual information 110 is already set on the vehicle (YES at 1216). Then, at step 1234, it is determined whether matching vehicle action or content is found. Where a matching vehicle action or content is not found (NO at step 1234), the process moves to step 1205, and the vehicle operates as normal. Where a matching vehicle action or content is found (YES at step 1234), at step 1236, the vehicle fetches matching vehicle action or content, for example, by communicating with a vehicle management system 1238. Then, at step 1240, the vehicle performs the matching device action.

Figure 13A:
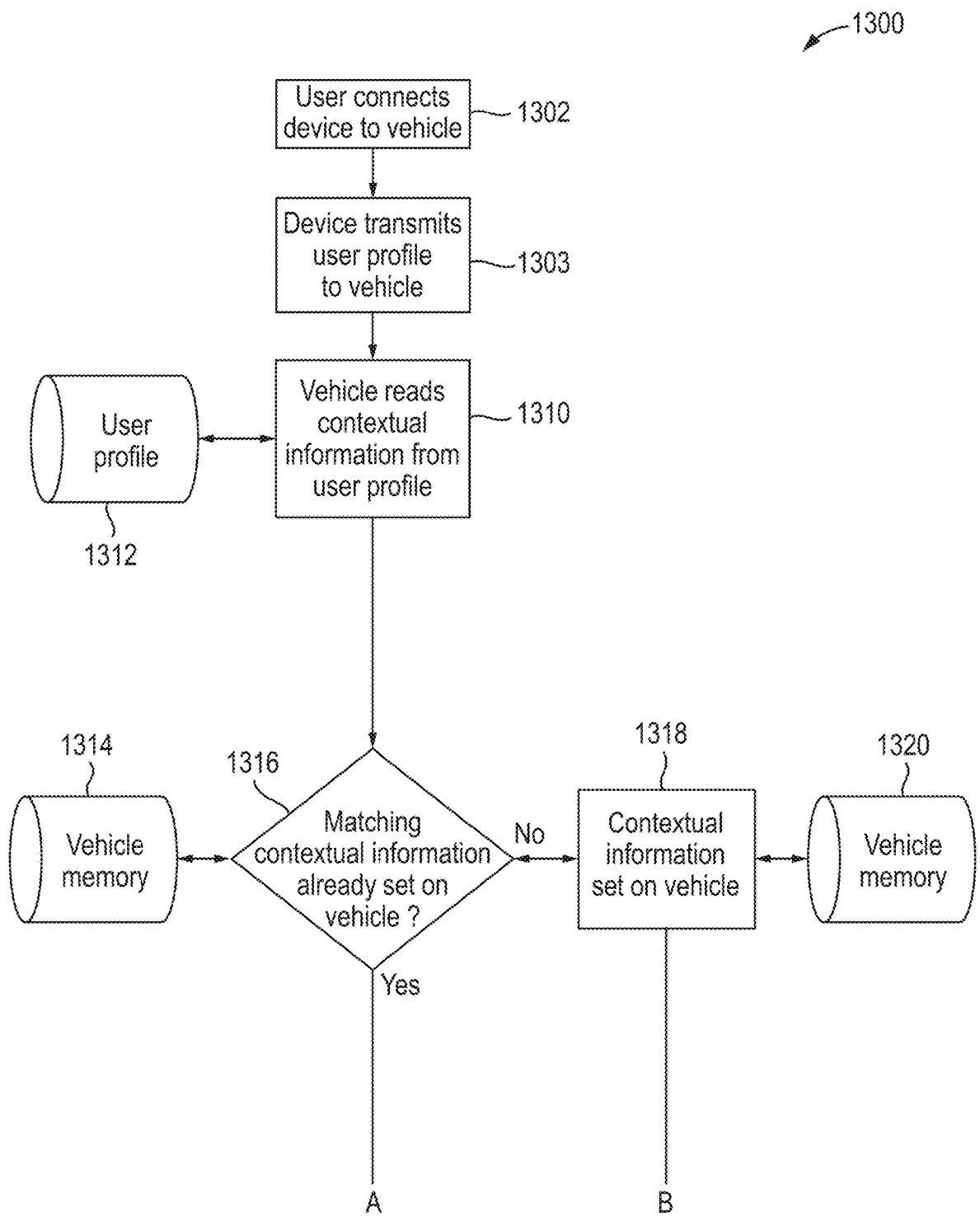
FIGS. 13A and 13B show a flowchart representing a process for modifying the settings of a vehicle based on contextual information set at a user profile, in accordance with some examples of the disclosure.
Figure 13B:
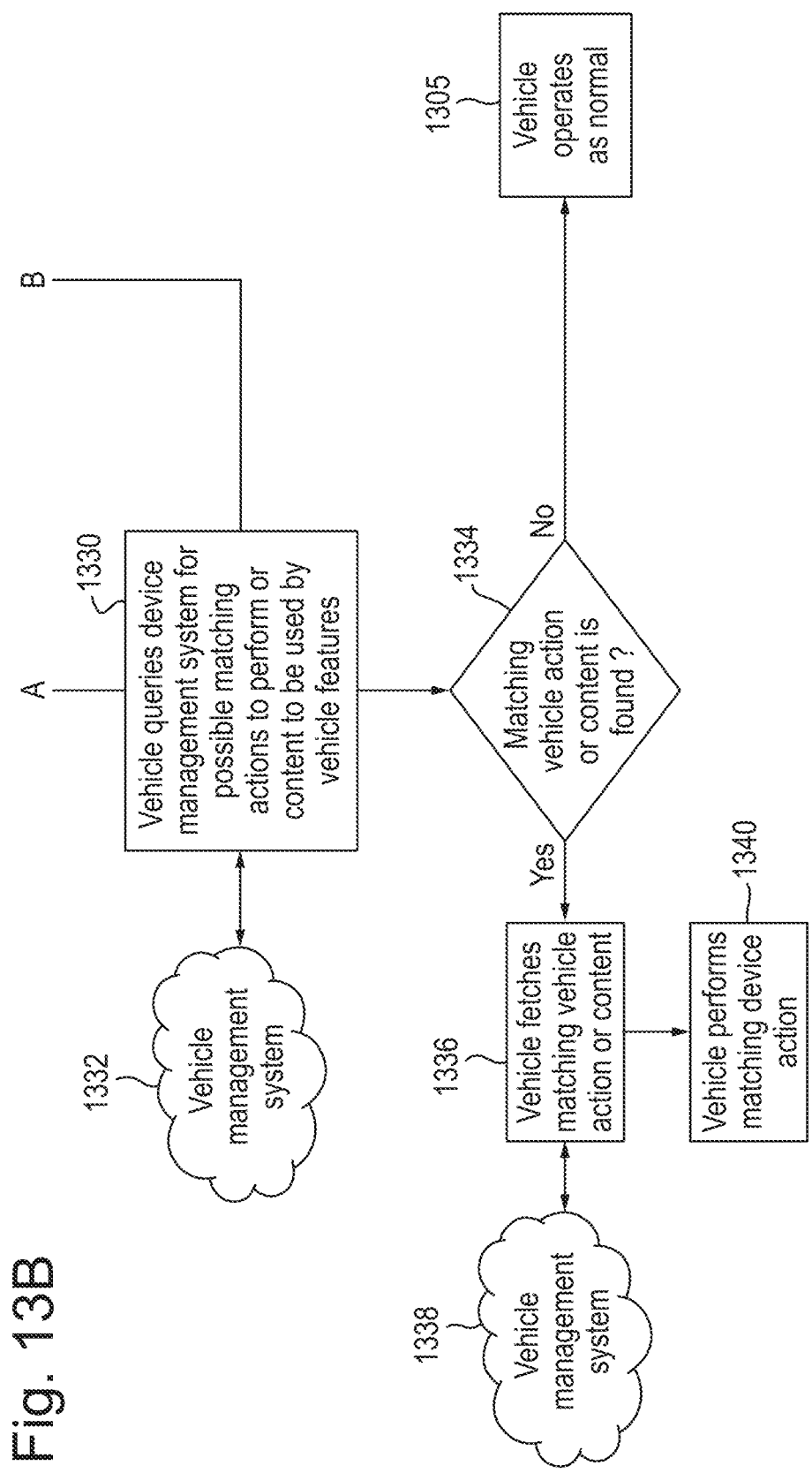

FIGS. 13A and 13B are an example of a process 1300 of modifying a vehicle (user device) to correspond to contextual information 110. In particular, in step 1302, it is determined that a user device is connected to a vehicle. For example, it may be determined that a user device such as a smartphone has connected to the vehicle, for example, using Bluetooth technology. The user device then transmits to the vehicle a user profile of the user of the user device, so that the user profile is received at the vehicle. Once the user profile has been received, at step 1310, the vehicle obtains contextual information 110 from the user profile 1312. Then, at step 1316, the vehicle queries internal storage of the vehicle (vehicle memory 1314) to determine if the obtained contextual information 110 matches contextual information 110 already set at the vehicle. Where it is determined that matching contextual information 110 is not already set at the vehicle (NO at step 1316), at step 1318, the obtained contextual information 110 is set as the contextual information 110 at the vehicle, for example, in the vehicle memory 1320. Then, the process moves to step 1330, where the vehicle queries a vehicle management system 1332 for matching actions to perform or content to be used by vehicle features. The process also moves to step 1330 where the matching contextual information 110 is already set on the vehicle (YES at 1316). Then, at step 1334, it is determined whether matching vehicle action or content is found. Where a matching vehicle action or content is not found (NO at step 1334), the process moves to step 1305, and the vehicle operates as normal. Where a matching vehicle action or content is found (YES at step 1334), at step 1336, the vehicle fetches matching vehicle action or content, for example, by communicating with a vehicle management system 1338. Then, at step 1340, the vehicle performs the matching device action.

In some examples, the user device may comprise a wireless speaker, headphones or home assistant with a built-in speaker, having the ability to play a sound indicating a connection to a further device such as a mobile phone or tablet. The user device may modify the sound, notification or other connection indicator indicating a connection with a further device based on a change (possibly time limited) of the contextual information 110 attribute of the user's profile. For example, a user may select an image of a cowboy for use as a background or as wallpaper on a first user device 101. The contextual information 110 derived from the image of the cowboy (e.g., "western") may then be used select for a notification sound the sound of a cow lowing ("Moo") when the headphones of the user are connected to a mobile device of the user.

Figure 14:
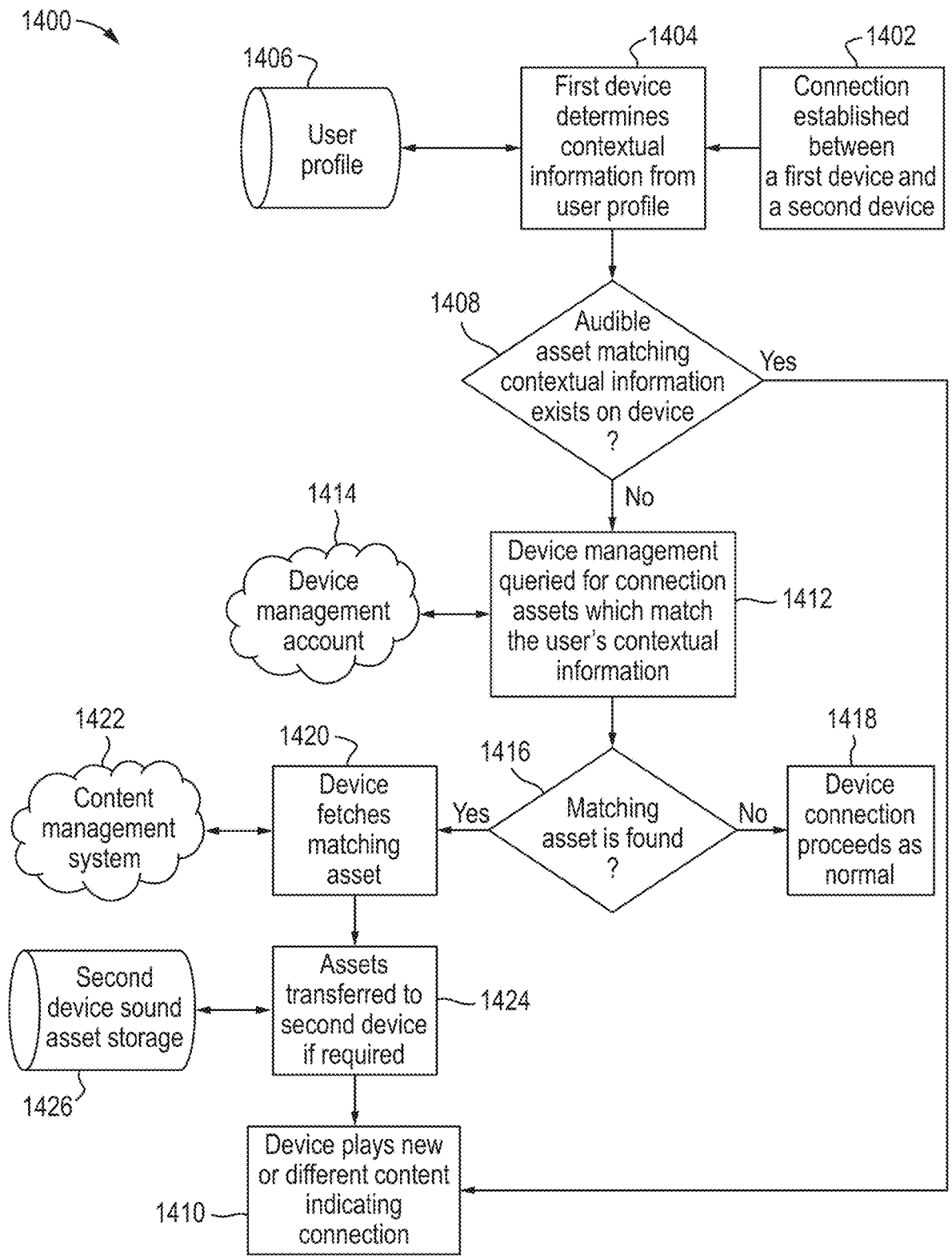
FIG. 14 shows a flowchart representing a process for modifying the settings of a second user device connected to a first user device based on contextual information, in accordance with some examples of the disclosure.

FIG. 14 is an example of a process 1400 for modifying a connection tone indicating the connection of a first user device 101 to a second user device 112. In particular, FIG. 14 illustrates a method of determining the contextual information 110 setting associated with a user's profile at a first user device 101 when the first user device 101 initiates a connection to a second user device 112 (such as a pair of headphones), determining if a change in the contextual information 110 has occurred, searching a cloud asset system for additional "audible" tones, and transferring (where necessary) the new tone to the second user device 112 for storage and playback when the first user device 101 connects or disconnects to the second user device 112.

In step 1402, a connection initiated by a user is established between a first user device 101 to a second user device 112. For example, a wired or wireless connection (e.g., Bluetooth) may be initiated between a first user device 101 such as a smartphone, and a second user device 112 such as a pair of headphones. Then, at step 1404, the first user device 101 determines current contextual information 110 relating to the user from the user profile 1406 stored at the first user device 101. It is then determined at step 1408 whether audible assets matching the contextual information 110 exists on the first user device 101. Where it is determined that assets exist (YES) at step 1408, the process moves to step 1410, and the second user device 112 plays a new or different content corresponding to the existing assets indicating a connection of the first user device 101 with the second user device 112. Where it is determined that assets do not exist (NO) at step 1408, at step 1412 a device management system 1414 is queried for connection assets which match the user's contextual information 110. Then, at step 1416 it is determined whether a matching asset has been found. Where at step 1416 it is determined that a matching asset has not been found (NO at step 1416), at step 1418, the device connection proceeds as normal. Where at step 1416 it is determined that a matching asset has been found (YES at step 1416), at step 1420, the first user device 101 fetches the matching asset, for example, by communicating with a content management system 1422. Where required, at step 1424, the assets are transferred to the second user device 112, for example, by communicating with sound asset storage 1426 of the second user device 112. Then, at 1410, the device plays new of different content corresponding to the asset, indicating a connection of the first user device 101 to the second user device 112.

In some examples, an output or recommendation of media content may be output to a user device based on the contextual information 110 (and/or a theme). For example, where the user device or an application of a user device is designed for music playback, such as a smart speaker or an audio playback application on a device, a default category for media content to be presented to the user or output may be temporarily set which is associated with the contextual information 110. For example, where contextual information 110 is set to "beach" or "ocean", in response to a user device receiving a request such as "Play Music" or "Play My Playlist", the music that is output may be associated with island beats or summer songs.

Figure 15B:
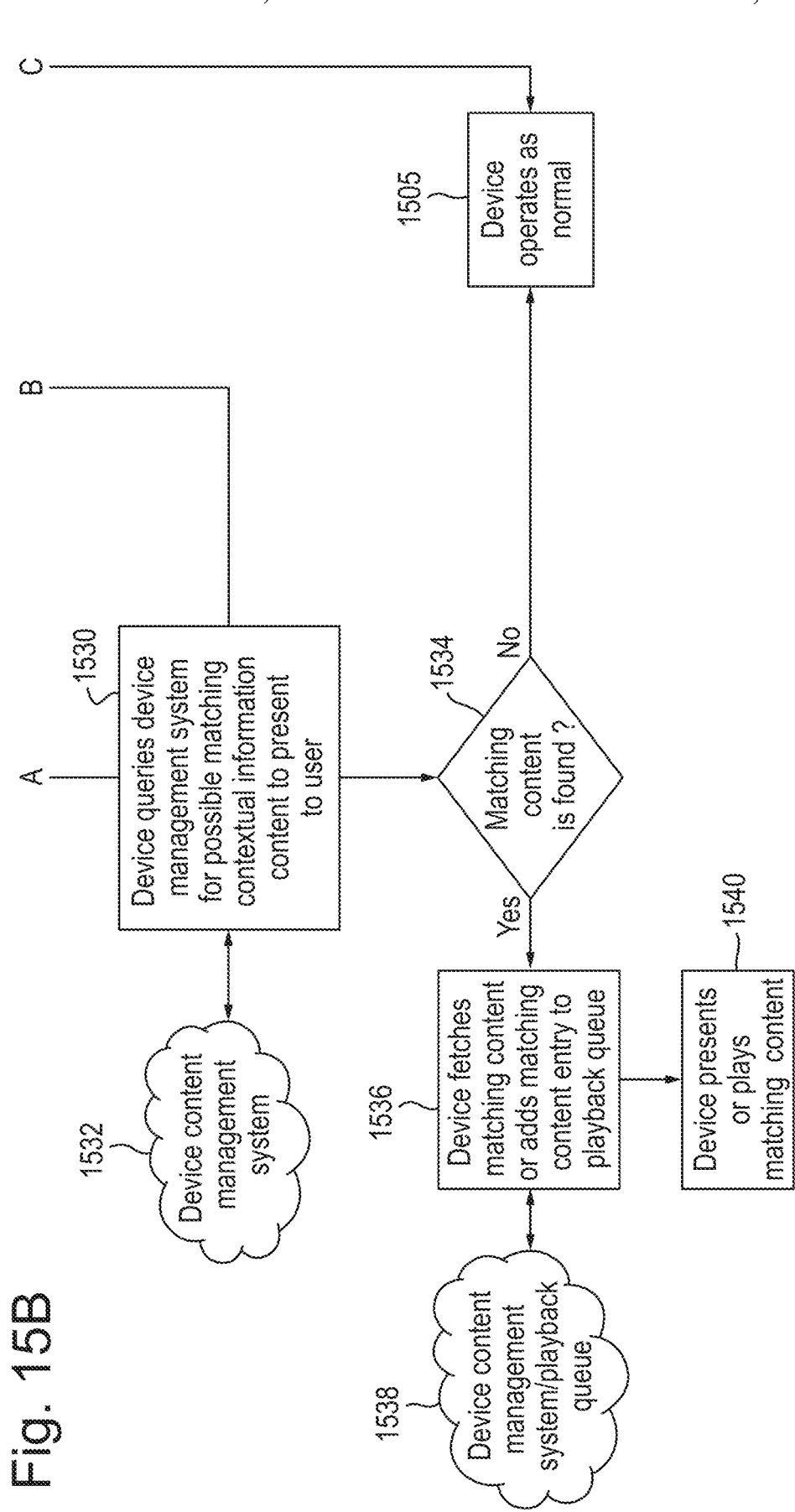

FIGS. 15A and 15B are an example of a process 1500 of selecting media content to be output or suggested at a user device. In particular, in step 1502, it is determined that a user is browsing content at a user device. For example, a user may be browsing the internet, or browsing media content in an application of a user device, such as a streaming application (video or audio). Then, at step 1504, an attempt is made to identify or detect the user who is browsing the content. For example, the user may be determined based on a user profile selected by the user from among a plurality of user profiles of a user account. Where it is not possible to identify the user (NO at step 1504), the process moves to step 1505, and the device operates as normal. Where it is possible to identify the user (YES at step 1504), at step 1506, the user device fetches a user profile corresponding to the identified user by communicating with a device user profile or management account 1508. Once the user profile has been detected, at step 1510, the device obtains contextual information 110 from the user profile 1512. Then, at step 1516, the user device queries internal storage of the user device (device memory 1514) to determine if the obtained contextual information 110 matches contextual information 110 already set at the user device. Where it is determined that matching contextual information 110 is not already set on the user device (NO at step 1516), at step 1518, the obtained contextual information 110 is set as the contextual information 110 at the user device, for example, in the device memory 1520. Then, the process moves to step 1530, where the user device queries a device content management system 1532 for possible media content which matches the contextual information 110. The process also moves to step 1530 where the matching contextual information 110 is already set on the user device (YES at 1516). Then, at step 1534, it is determined whether matching media content has been found. Where matching media content has not been found (NO at step 1534), the process moves to step 1505, and the user device operates as normal. Where matching media content has been found (YES at step 1534), at step 1536, the user device fetches matching content or adds a matching content entry to a playback queue, for example, by communicating with a device content management system 1538. Then, at step 1540, the user device presents, outputs or suggests the matching content at a user interface of the user device (e.g., at a screen and/or speaker).

In some examples, where the user device is a media playback device for visual content, such as a media streaming device, or a device comprising a media streaming application, in addition to or instead of a modification of a user interface or graphical element made based on contextual information 110 associated with the user's profile (e.g., contextual information 110 which has been derived from a user selection of a theme, image, profile representation or wallpaper, or so on, at a first user device 101), media categories and suggestions may be biased to reflect the contextual information 110 by presenting category or content suggestions (e.g., media content) which are associated with the contextual information 110. As is described above, FIG. 1 illustrates an example of a suggestion of media content at a first user device 101 based on the contextual information 110.

In some examples of the use of contextual information 110 to configure a plurality of devices, a theme corresponding to contextual information 110 may be set at a first user device 101, for example, the background and wallpaper of a first user device 101 may be set. Then, a media streaming device associated with the user may suggest media content corresponding to the contextual information 110, a smart watch associated with the user may use a notification sound corresponding to the contextual information 110 and alter the watch face to correspond to the contextual information 110, a shopping list of an online shopping service associated with a user profile of the user may suggest products (e.g., display an advertisement) corresponding to the contextual information 110, a virtual assistant device associated with the user may alter the colour of its notification lights and notification sounds to correspond to the contextual information 110, a vehicle of the user may alter its "skin" to colours corresponding to the contextual information 110, a games console of the user may suggest games corresponding to the contextual information 110, and a music streaming service associated with a user may suggest music corresponding to the contextual information 110.

In some examples, the contextual information 110 may be determined based on data related to the user (e.g., the user's profile). For example, the data may comprise any or any combination of information relating to a modification of a setting of a user device, media content associated with a user or user profile, a user preference, user history, location of a user, participation in a group event, upcoming calendar events, text messages, posts from a followed social media account, real-time data such as stock ticker data, a favourite sports team, and so on. For example, suggested media content, or the configuration of a user device, may be determined based on contextual information 110 corresponding to data relating to the user. For example, the data may be processed to determine a general category to which any of sounds, objects, people, animals, scenery, events, and so on, belong, and/or may provide information on the particular sounds, objects, people, animals, scenery, events, and so on, that can be derived from the data. For example, the user's date of birth may be used to suggest media content, such as movies, categories, songs, albums or playlists which were created in the year of birth of the user.

In some examples, the contextual information 110 may be based on content (e.g., media content) consumption such as when a user views content from within a streaming content service (e.g., media streaming service). Assets, such as particular songs, or images, and acquisition metadata (such as but not limited to Resource Locators, Access or Authorization tokens), which may be used in addition to the contextual information 110 relating to the user to modify a user device, may originate from the streaming service. In this way, content creators, such as those generating the content which is included in the content of the streaming service may provide additional content such as ring tones, notification sounds, images, and so on, to be used to modify settings of devices (e.g., devices within a user's device management account or devices which are or can be linked to a user's device management account profile) to correspond to contextual information 110 or a theme, such as a theme relating to particular media content (e.g., a film or TV show). For example, the voice of a smart assistant may be altered to a particular celebrity voice corresponding to a celebrity starring in a particular film (e.g., associated with the media content, or is to be promoted, where a particular film may be suggested based on contextual information). In some examples, the contextual information 110 (and additional information) may be determined based on the most recent or most consumed media (e.g. where a user has recently watched multiple episodes of a television program in quick succession—"binge watching").

Figure 16:
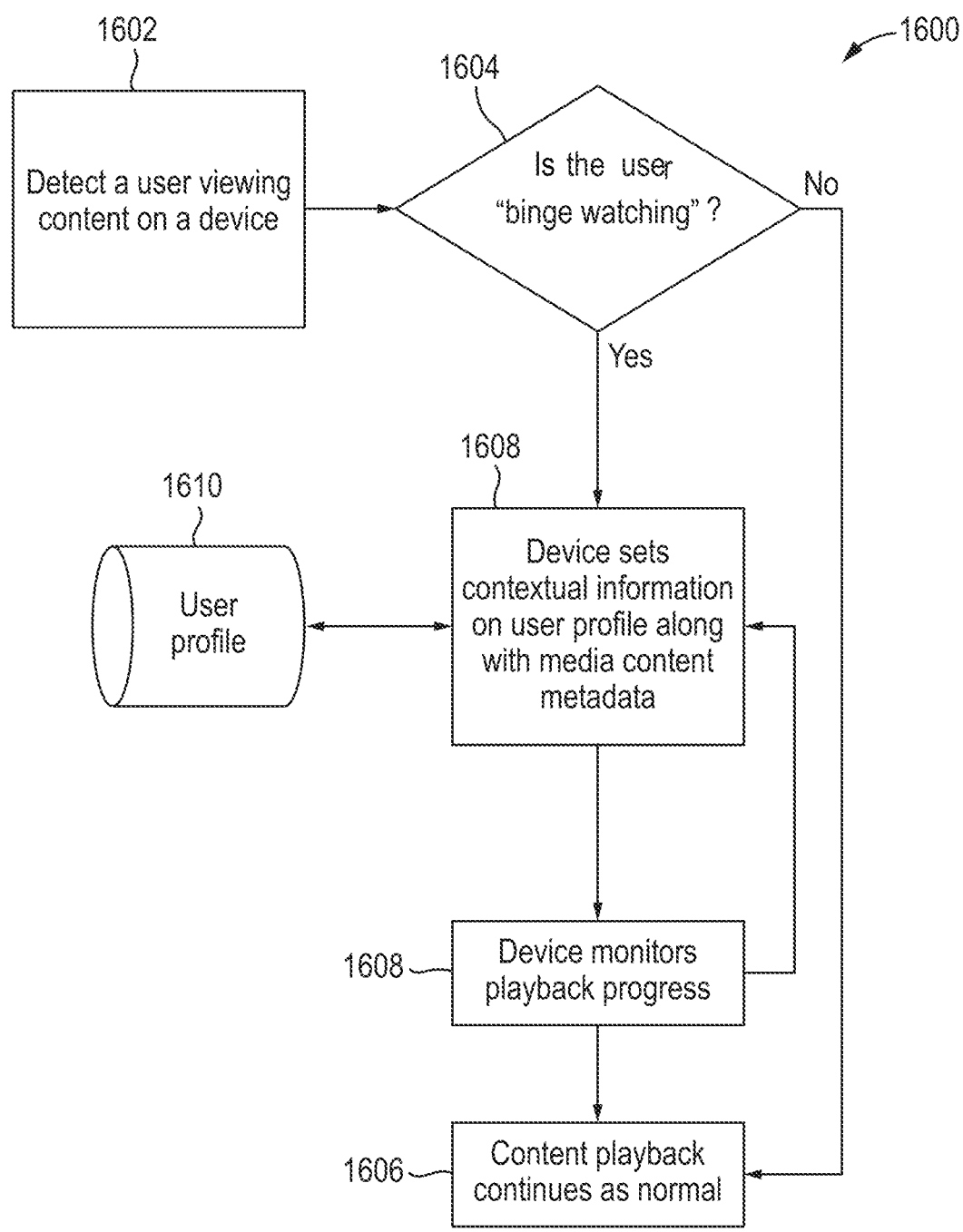
FIG. 16 shows a flow chart representing a process for setting contextual information at a user profile based on media content consumed by the user, in accordance with some examples of the disclosure.

FIG. 16 illustrates an example of a process 1600 for determining contextual information 110 to be associated with a user. In particular, at step 1602, a user viewing content on a device may be detected, for example, a device which is configured to update the user's profile directly or through an association link, "plugin" or "skill". Then, at 1604, it is determined whether a user is "binge watching" media content (e.g., where a user is watching multiple episodes of a television program in quick succession). Where it is determined that a user is not "binge watching" (NO at step 1602), at step 1606, content playback continues as normal. Where it is determined that a user is "binge watching" (YES at step 1602), at step 1608, contextual information 110 corresponding to the consumed media content is set at the user profile 1610, along with media content metadata (e.g., title, playback progress, episodes, service information, authorization or access token(s), mobile app launch URL or link). Then, at step 1612, the device monitors playback progress of the media content. For example, the device monitors which episode the user is currently watching, or determines the user's progress through an episode. The contextual information 110 (and content metadata) is continuously or periodically updated (e.g., set step 1608) based on the user's progress through the media content. Additionally, at step 1606, the content playback continues (e.g., is not interrupted by the configuring of the contextual information 110).

In some examples, an option may be provided for a user to receive updates to the operational theme (e.g., update the contextual information 110). For example, a user may select an option to "follow and subscribe" to content relating to particular media content, e.g., from an option presented at a first user device 101 (which may be linked to the user's device management profile either directly or via a "plug in" or "skill"), such as media content of a streaming media service. The media streaming service may provide the contextual information 110, or the "theme", or the contextual information 110 may be derived based on updates of the user's progress through particular media content. For example, the selection of the option to "follow and subscribe" may enable a theme corresponding to the media content to be applied to user devices of the user, and additionally may enable the theme to be dynamically updated to correspond to the user's progress through the media content. In some examples, the option may be output to a user interface alongside options such as viewing, renting, or purchasing the media content.

Figure 17:
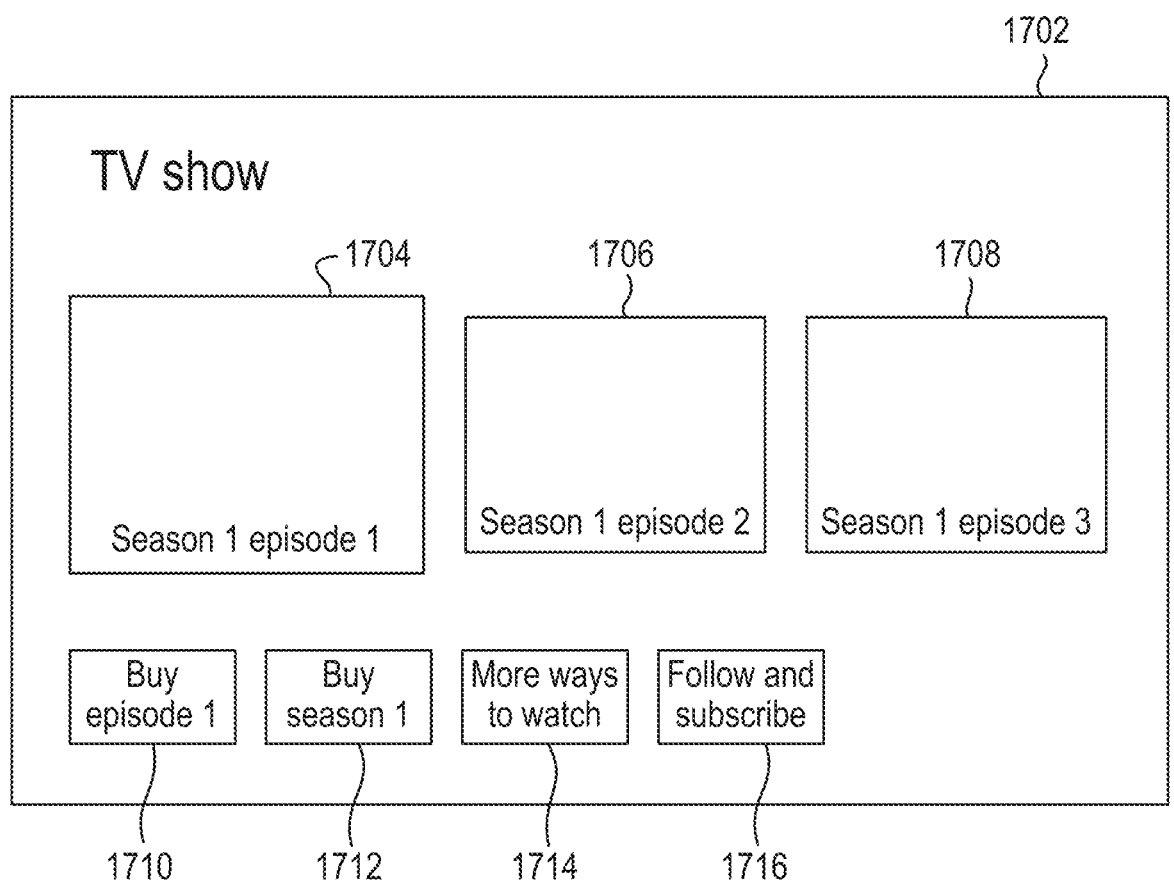
FIG. 17 is an example of a user interface, in accordance with some examples of the disclosure.

FIG. 17 illustrates an example of a user interface 1702 of a media streaming service comprising an option to receive updates to the operational theme. As is shown in this example, the interface 1702 comprises a plurality of buttons corresponding to a first episode of a first series 1704, a second episode of a first series 1706, and a third episode of a first series 1708. Various options are presented to the user for obtaining the media content, such as buttons corresponding to purchasing a copy of episode 1 1710, purchasing a copy of the first season 1712, and more ways to watch the media content 1714. In this example, an option is also provided to "follow and subscribe" to the content 1716, as is described above.

In some examples, based on the contextual information 110 associated with a user, a suggestion of playlists, songs or other content (e.g., media content) may be output to a user device (e.g., suggested to a user). For example, an audio streaming application may suggest "beach music" when the contextual information 110 associated with the user is set to "beach". A suggestion of media content may also be made based on a user selecting an option to receive updates to the operational theme or contextual information 110, for example, where the user has selected a TV show to "follow and subscribe" to, and/or where the user has watched an at least one episode of a TV show on a linked streaming media device or service, an audio application may then suggests a soundtrack to the TV show. When "following and subscribing" to media content, the contextual information 110 associated with the user may be dynamically changed (or updated) based on the current or last viewed content of the media content, for example, where a user is watching episodes of a TV show (e.g., has watched an at least one episode), the contextual information 110 may be updated to correspond to the last viewed episode of the TV show. Similarly, the contextual information 110 may be updated based on a recently played video game. For example, where a user has recently played a video game, the soundtrack for that video game may be output from an audio streaming service as suggested content or included in a playlist at a user device of the user.

Figure 18:
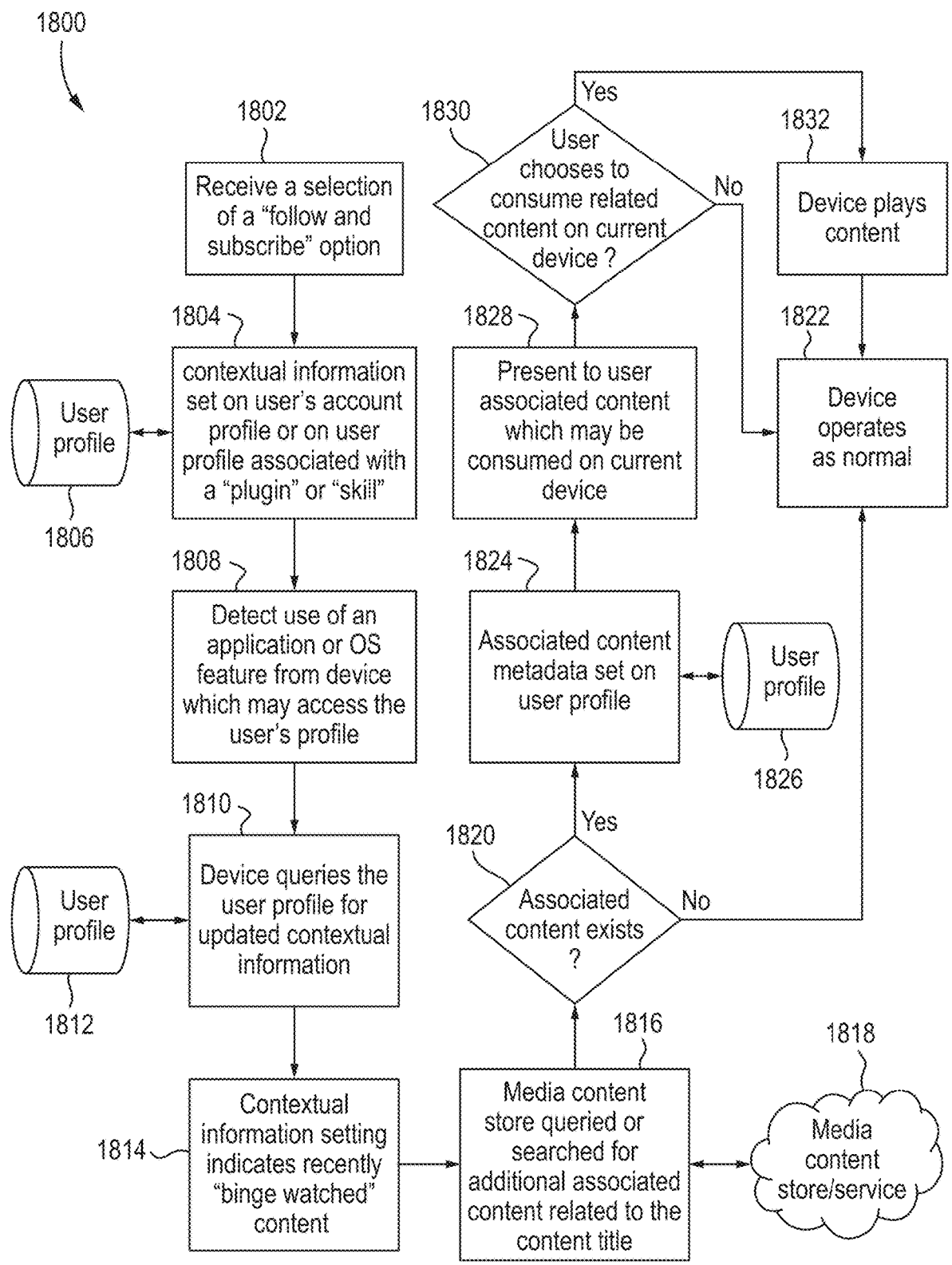
FIG. 18 shows a flow chart representing a process for updating contextual information and outputting to a user device content derived from the contextual information, in accordance with some examples of the disclosure.

FIG. 18 illustrates an example of a process 1800 in which a user opts to receive updates to contextual information 110 (e.g., chooses to "follow and subscribe" to content) based on the user's progression through media content (such as a TV show). In particular, at step 1802, a selection of a "follow and subscribe" option, for example, a selection made by a user from an option output at a media playback device such as a media streaming device, is received, for example, in association with a TV show watched by the user. Then, at step 1804 contextual information 110 is set on an account profile of the user or on a user profile 1806 associated with a "plugin" or "skill", for example, of the media playback device. Then, at step 1808, a user's use of an application or operating system feature at a device which is configured to access the user's profile is detected. Then, at step 1810, the device queries the user profile 1812 for updated contextual information 110. Then, at step 1814, the contextual information 110 indicates recently "binge watched" content. Then, at step 1816, a media content store or service 1818 is queried or searched for additional associated content related to the indicated content. Then, at step 1820, it is determined whether the associated content exists. Where it is determined that the associated content does not exist (NO at step 1820), the process moves to step 1822, and the device operates as normal. Where it is determined that the associated content does exist (YES at step 1820), at step 1824, metadata corresponding to the associated content is set on a user profile 1826 for use by additional devices linked to the user profile. At step 1828, additional content which may be consumed on a device currently used by the user is presented to the user. At step 1830, the user then decides whether to consume the related content on the current device. Where the user opts to consume the related content on the current device (YES at step 1830), the current device plays the content at step 1832. Then, the device operates as normal at step 1822. Where the user does not opt to consume the related content on the current device (NO at step 1830), the device operates as normal at step 1822.

In some examples, an option to add media content to a user profile may be output to a user device, for example, in the form of a recommendation of the media content. For example, where the media content is video content, an option to add media content associated with the media content may be output to the user device. For example, an option to "add soundtrack", "rent soundtrack" or "purchase soundtrack" associated with media content may be output to a user device upon reception of an indication that the user is viewing the media content, for example, on a media streaming device or service. For example, the user chooses to watch a particular film, and during the viewing, an option is output to the user device for the user to rent or purchase the soundtrack playlist for the film (e.g., to add to a music application or service to which the user subscribes), from an audio (e.g., music) streaming or licensing service. In some examples, a video streaming service may be aware of and/or have access to a user's music subscription plan of an audio streaming service, and may output a recommendation for the user to purchase one or more songs (e.g., songs that are featured in the background of a scene, or in a clubbing scene, etc.) if the genre of the song(s) match the user's known music preferences, and the user does not have access to these particular songs as part of their audio streaming service subscription or haven't been purchased before. Similarly, using automatic content recognition (ACR) technology, the offer to purchase the songs may occurs in real-time.

Figure 19:
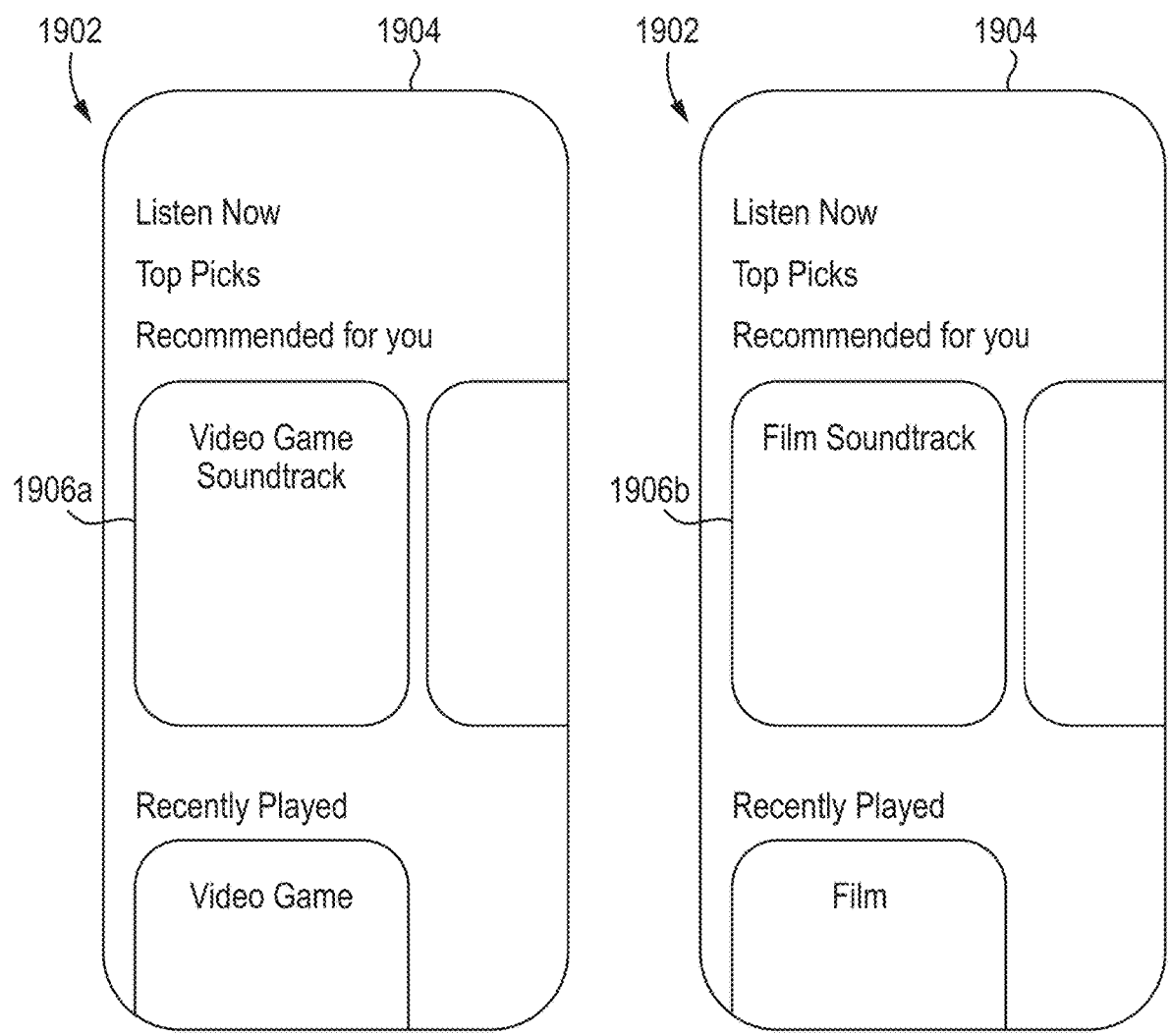
FIG. 19 is an example of a user interface, in accordance with some examples of the disclosure.

FIG. 19 illustrates an example of a recommendation output to a user device, where a user may opt to select media content based on the output. In particular, as is illustrated in FIG. 19, a user device 1902 comprises a user interface 1904 comprising a button 1906a, 1906b indicating media content corresponding to contextual information relating to a user. In particular, the recommended media content corresponds to media content which has recently been consumed by a user. As is illustrated on the left hand side of FIG. 19, a button 1906a showing video game soundtrack is suggested to a user, as the user has recently played the video game. As is illustrated on the right hand side of FIG. 19, a button 1906b showing a film soundtrack is suggested to a user, as the user has recently watched the film. A user may consume the recommended media content by selecting the button 1906a, 1906b.

Figure 20:
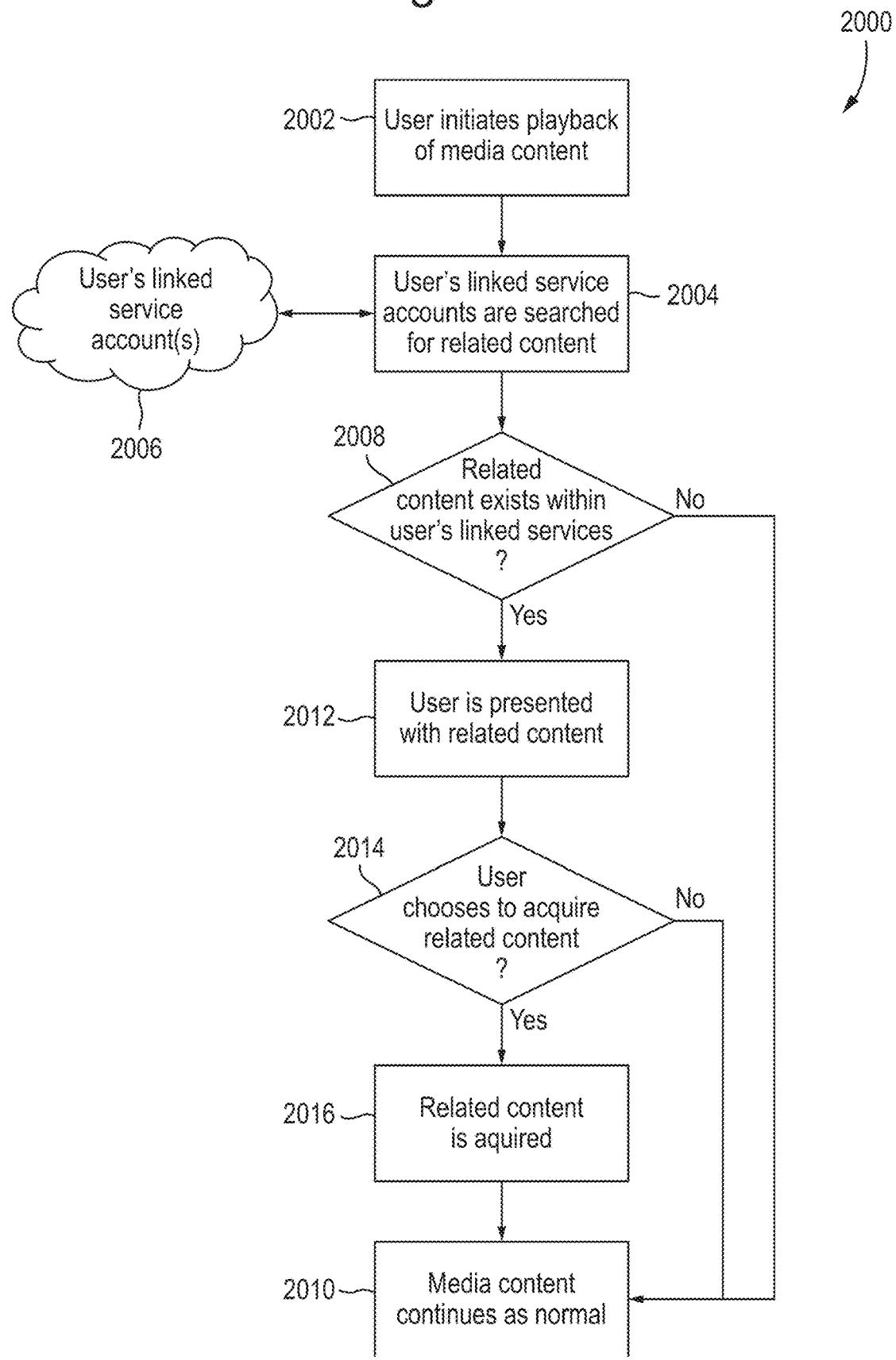
FIG. 20 shows a flow chart representing a process for acquiring media content, in accordance with some examples of the disclosure.

FIG. 20 illustrates an example of a process 2000 in which a user may acquire media content. At step 2002, a user initiates playback of media content. For example, a user may select an episode of a TV series to play on a user device. Then, at step 2004, a user's linked service accounts 2006 (e.g., a music streaming account, a video streaming account, and so on) are searched for related content. At 2008, it is determined whether related content exists within the user's linked services. Where it is determined that related content does not exist within the user's linked services (NO at step 2008), the process moves to step 2010, and media content continues as normal (e.g., the output of media content continues as normal). Where it is determined that related content exists within the user's linked services (YES at step 2008), at step 2012, the user is presented with related content (e.g., for rent or purchase). Then, at step 2014, it is determined whether the user has chosen to acquire the related content. Where it is determined that a user has not chosen to acquire the related content (NO at step 2014), the process moves to step 2010, and media content continues as normal. Where it is determined that a user has chosen to acquire the related content (YES at step 2014), the related content is acquired (e.g., licensed within the chosen linked service account). Then, at step 2010, the media content continues as normal.

In some examples, the user's progress through media content (e.g., "viewing progress" or "bookmark") may be included and dynamically updated on the user's profile along with the contextual information 110 relating to the user. An option for a user to continue to consume media content may be output to enable a user to continue to consume the media content from a point at which they had previously stopped (e.g., a "continue watching" feature).

The option for the user to continue to consume the media content may be accessed from within an asset which has been themed based on the contextual information 110 (for example, from within a user's smart phone wallpaper or screen widget).

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features and limitations described in any one example may be applied to any other example herein, and flowcharts or examples relating to one example may be combined with any other example in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   determining, using control circuitry, a modification of a setting of a first user device;
   deriving, using control circuitry, contextual information relating to the modification, wherein the deriving of the contextual information comprises:
      monitoring consumption of media assets at the first user device; and
      deriving the contextual information from the consumed media assets by using an automatic content recognition technique; and
   automatically modifying, using control circuitry, a setting of a second user device based on the derived contextual information.

2. The method of claim 1, wherein an operational theme is determined based on the contextual information, and wherein the operational theme defines the setting of the second user device.

3. The method of claim 2, wherein the operational theme is a predefined theme corresponding to the contextual information, or is generated based on the contextual information.

4. The method of claim 1, where the modification of the setting of the second user device comprises at least one of a modification of the setting of an interface of the second user device, a modification of the setting of an appearance of the second user device, or a modification of the setting of a physical configuration of the second user device.

5. The method of claim 1, where the modification of the setting of the first user device comprises at least one of a modification of the setting of an interface of the first user device, a modification of the setting of an appearance of the first user device, a modification of a setting of a physical configuration of the first user device, a selection of a wallpaper for the first user device, a selection of a screensaver for the first user device, a selection of a theme for the first user device, a selection of an audio file for a notification setting of the first user device, or a selection of an audio file for use with a virtual assistant.

6. The method of claim 1, wherein the first user device and the second user device are at least one of linked by a user profile, connected to a user device linked to a user profile, or used by the user.

7. The method of claim 2, further comprising outputting to an interface of the first user device or the second user device an option to update the operational theme when additional information is received, and wherein the operational theme is updated responsive to receiving confirmation that the operational theme is to be updated.

8. The method of claim 1, wherein the method further comprises outputting a representation of the modification of the setting of the second user device to a user interface of the first user device or the second user device prior to modifying the setting, and wherein the setting of the second user device is modified responsive to receiving confirmation that the modification of the setting is to be applied.

9. The method of claim 1, wherein the method further comprises outputting a recommendation of media content based on the derived contextual information.

10. The method of claim 1, wherein monitoring the consumption of the media assets at the first user device comprises monitoring progress through the media assets at the first user device.

11. A system comprising control circuitry configured to:
    determine a modification of a setting of a first user device;
    derive contextual information relating to the modification, wherein the deriving of the contextual information comprises:
       monitoring consumption of media assets at the first user device; and
       deriving the contextual information from the consumed media assets by using an automatic content recognition technique; and
    automatically modify a setting of a second user device based on the derived contextual information.

12. The system of claim 11, wherein an operational theme is determined based on the contextual information, and wherein the operational theme defines the setting of the second user device.

13. The system of claim 12, wherein the operational theme is a predefined theme corresponding to the contextual information, or is generated based on the contextual information.

14. The system of claim 11, where the modification of the setting of the second user device comprises at least one of a modification of the setting of an interface of the second user device, a modification of the setting of an appearance of the second user device, or a modification of the setting of a physical configuration of the second user device.

15. The system of claim 11, where the modification of the setting of the first user device comprises at least one of a modification of the setting of an interface of the first user device, a modification of the setting of an appearance of the first user device, a modification of a setting of a physical configuration of the first user device, a selection of a wallpaper for the first user device, a selection of a screensaver for the first user device, a selection of a theme for the first user device, a selection of an audio file for a notification setting of the first user device, or a selection of an audio file for use with a virtual assistant.

16. The system of claim 11, wherein the first user device and the second user device are at least one of linked by a user profile, connected to a user device linked to a user profile, or used by the user.

17. The system of claim 12, wherein the operational theme is updated responsive to receiving additional information associated with the operational theme.

18. The system of claim 17, wherein the control circuitry is further configured to output to an interface of the first user device or the second user device an option to update the operational theme when the additional information is received, and wherein the operational theme is updated responsive to receiving confirmation that the operational theme is to be updated.

19. The system of claim 11, wherein the control circuitry is further configured to output a representation of the modification of the setting of the second user device to a user interface of the first user device or the second user device prior to modifying the setting, and wherein the setting of the second user device is modified responsive to receiving confirmation that the modification of the setting is to be applied.

20. The system of claim 11, wherein the control circuitry is further configured to output a recommendation of media content based on the derived contextual information.

* * * * *